(12) United States Patent
Kopp

(10) Patent No.: US 9,851,510 B2
(45) Date of Patent: Dec. 26, 2017

(54) PHASE LOCKING OPTICAL FIBER COUPLER

(71) Applicant: Chiral Photonics, Inc., Pine Brook, NJ (US)

(72) Inventor: Victor Il'ich Kopp, Fair Lawn, NJ (US)

(73) Assignee: Chiral Photonics, Inc., Pine Brook, NJ (US)

( * ) Notice: Subject to any disclaimer, the term of this patent is extended or adjusted under 35 U.S.C. 154(b) by 0 days.

(21) Appl. No.: 15/204,980

(22) Filed: Jul. 7, 2016

(65) Prior Publication Data
US 2017/0192176 A1 Jul. 6, 2017

Related U.S. Application Data

(60) Provisional application No. 62/199,849, filed on Jul. 31, 2015.

(51) Int. Cl.
*G02B 6/26* (2006.01)
*G02B 6/30* (2006.01)
(Continued)

(52) U.S. Cl.
CPC .............. *G02B 6/305* (2013.01); *G02B 6/26* (2013.01); *G02B 6/30* (2013.01); *G02B 6/02042* (2013.01); *G02B 6/04* (2013.01)

(58) Field of Classification Search
CPC ......... H01S 3/094015; H01S 3/094023; H01S 3/094053
See application file for complete search history.

(56) References Cited

U.S. PATENT DOCUMENTS 5,608,571 A * 3/1997 Epworth ............. H01S 3/10023
359/337
6,396,859 B1 5/2002 Kopp et al.
(Continued)

FOREIGN PATENT DOCUMENTS

WO   WO 2002/073247 A2   9/2002
WO   WO 2006/046947 A2   5/2006
(Continued)

*Primary Examiner* — Chris Chu
(74) *Attorney, Agent, or Firm* — Knobbe, Martens, Olson & Bear, LLP

(57) ABSTRACT

The inventive configurable optical fiber polarization mode coupler is capable of providing a low-loss, high-coupling coefficient interface with high accuracy and easy alignment between a plurality of optical fibers (or other optical devices) with a first channel-to-channel spacing, and an optical device having a plurality of closely-spaced waveguide interfaces with a second channel-to-channel spacing, where each end of the optical fiber coupler array is configurable to have different channel-to-channel spacing, each matched to a corresponding one of the first and second channel-to-channel spacing, and that are preferably optimized for use with photonic integrated circuits, such as coupling to dense optical input/output interfaces, wafer-level testing, etc. The novel optical coupler array includes a plurality of waveguides (at least one of which may optionally be polarization maintaining), that comprises at least one gradually reduced vanishing core fiber, at least in part embedded within a common housing structure. Advantageously, at least one embodiment of the present invention comprises a phase locking optical fiber coupler comprising at least one optical fiber coupler configured as a pitch reducing optical fiber array (PROFA) component configured and optimized coherent combining of multiple optical fiber lasers to produce multi-kilowatt single mode laser sources.

1 Claim, 13 Drawing Sheets

(51) Int. Cl.
  *G02B 6/02* (2006.01)
  *G02B 6/04* (2006.01)

(56) References Cited

U.S. PATENT DOCUMENTS

| | | | |
|---|---|---|---|
| 6,404,789 B1 | 6/2002 | Kopp et al. |
| 6,411,635 B1 | 6/2002 | Kopp et al. |
| 6,671,293 B2 | 12/2003 | Kopp et al. |
| 6,678,297 B2 | 1/2004 | Kopp et al. |
| 6,721,469 B2 | 4/2004 | Kopp et al. |
| 6,741,631 B2 | 5/2004 | Kopp et al. |
| 6,744,943 B2 | 6/2004 | Kopp et al. |
| 6,792,169 B2 | 9/2004 | Kopp et al. |
| 6,839,486 B2 | 1/2005 | Kopp et al. |
| 6,875,276 B2 | 4/2005 | Shibayev et al. |
| 6,891,992 B2 | 5/2005 | Kopp et al. |
| 6,925,230 B2 | 8/2005 | Kopp et al. |
| 7,009,679 B2 | 3/2006 | Kopp et al. |
| 7,095,911 B2 | 8/2006 | Kopp et al. |
| 7,142,280 B2 | 11/2006 | Kopp et al. |
| 7,242,702 B2 | 7/2007 | Kopp et al. |
| 7,308,173 B2 | 12/2007 | Kopp et al. |
| 7,463,800 B2 | 12/2008 | Kopp et al. |
| 7,983,515 B2 | 7/2011 | Zhang et al. |
| 8,218,921 B2 | 7/2012 | Kopp et al. |
| 8,326,099 B2 | 12/2012 | Singer et al. |
| 8,457,456 B2 | 6/2013 | Kopp et al. |
| 8,463,094 B2 | 6/2013 | Kopp et al. |
| 8,712,199 B2 | 4/2014 | Kopp et al. |
| 8,948,547 B2 | 2/2015 | Kopp |
| 2002/0003827 A1 | 1/2002 | Genack et al. |
| 2002/0069676 A1 | 6/2002 | Kopp et al. |
| 2002/0118710 A1 | 8/2002 | Kopp et al. |
| 2002/0172461 A1 | 11/2002 | Singer et al. |
| 2003/0118285 A1 | 6/2003 | Kopp et al. |
| 2004/0145704 A1 | 7/2004 | Kopp et al. |
| 2006/0245704 A1* | 11/2006 | Nagayasu ............ H01S 3/06754 385/123 |
| 2008/0098772 A1 | 5/2008 | Kopp et al. |
| 2009/0324159 A1 | 12/2009 | Kopp et al. |
| 2010/0002983 A1 | 1/2010 | Kopp et al. |
| 2010/0158438 A1 | 6/2010 | Churikov et al. |
| 2011/0292676 A1 | 12/2011 | Weiner et al. |
| 2011/0293219 A1 | 12/2011 | Weiner et al. |
| 2012/0189241 A1 | 7/2012 | Kopp et al. |
| 2012/0257857 A1 | 10/2012 | Kopp et al. |
| 2013/0121641 A1 | 5/2013 | Singer et al. |
| 2013/0188174 A1 | 7/2013 | Kopp et al. |
| 2013/0188175 A1 | 7/2013 | Kopp et al. |
| 2013/0216184 A1 | 8/2013 | Kopp et al. |
| 2014/0294345 A1 | 10/2014 | Kopp et al. |
| 2015/0212274 A1 | 7/2015 | Kopp |
| 2017/0108650 A1 | 4/2017 | Weiner et al. |

FOREIGN PATENT DOCUMENTS

| WO | WO 2008/080174 A1 | 7/2008 |
|---|---|---|
| WO | WO 2017/053479 A1 | 3/2017 |
| WO | WO 2017/100667 A1 | 6/2017 |

\* cited by examiner

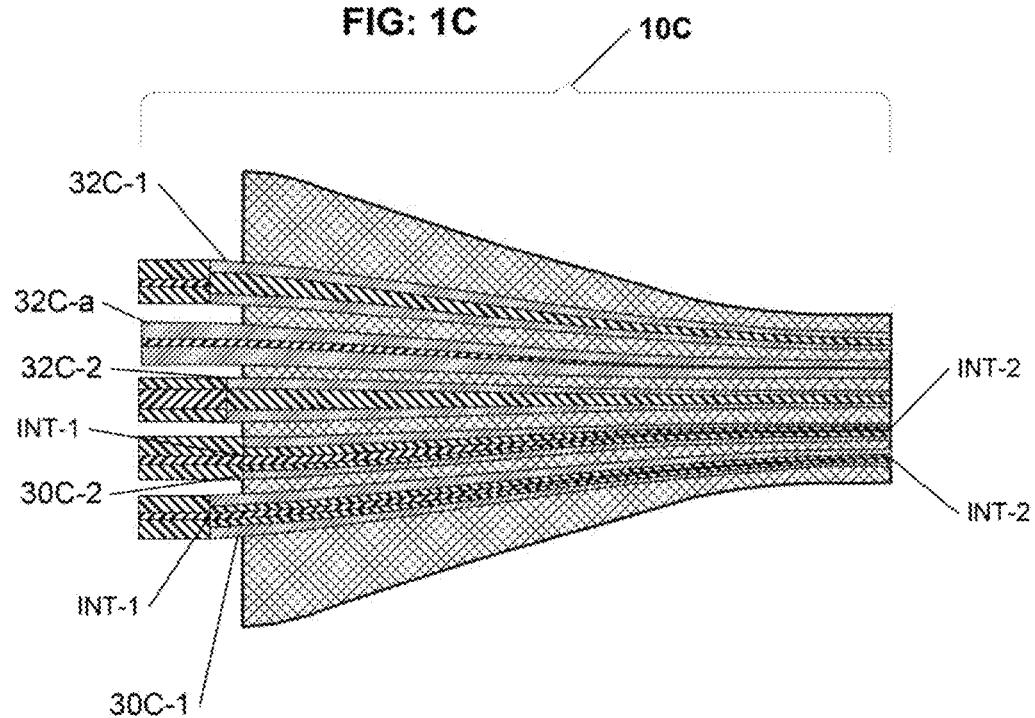
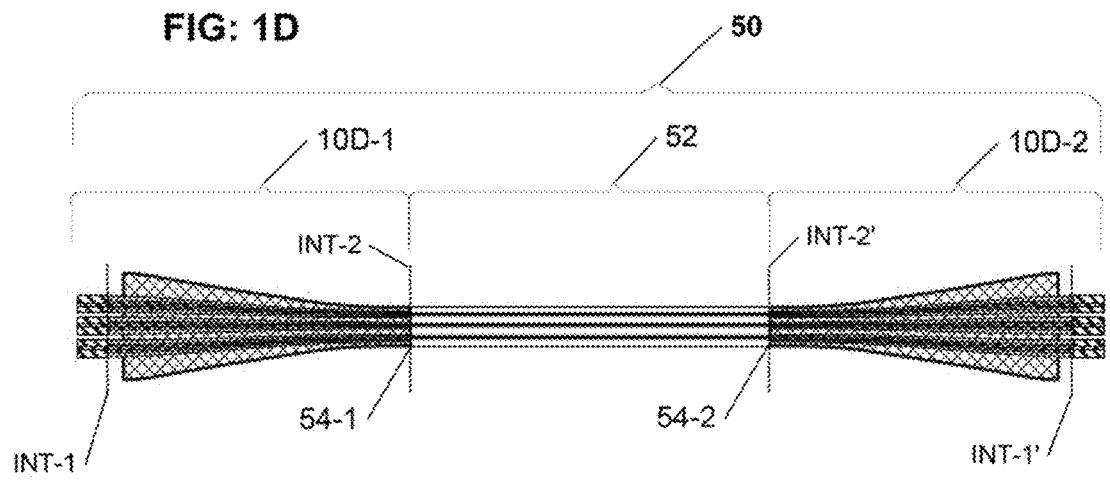

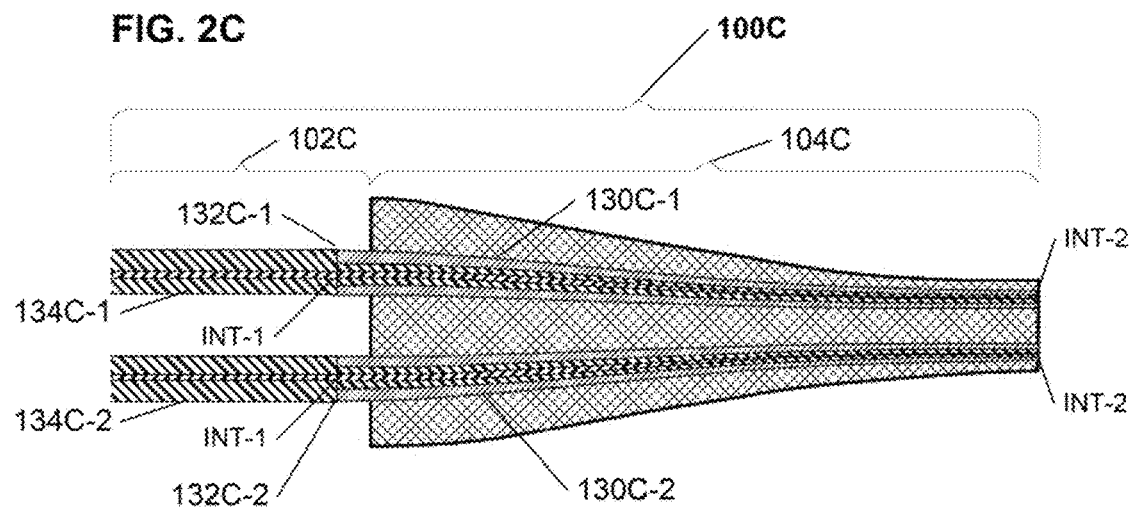
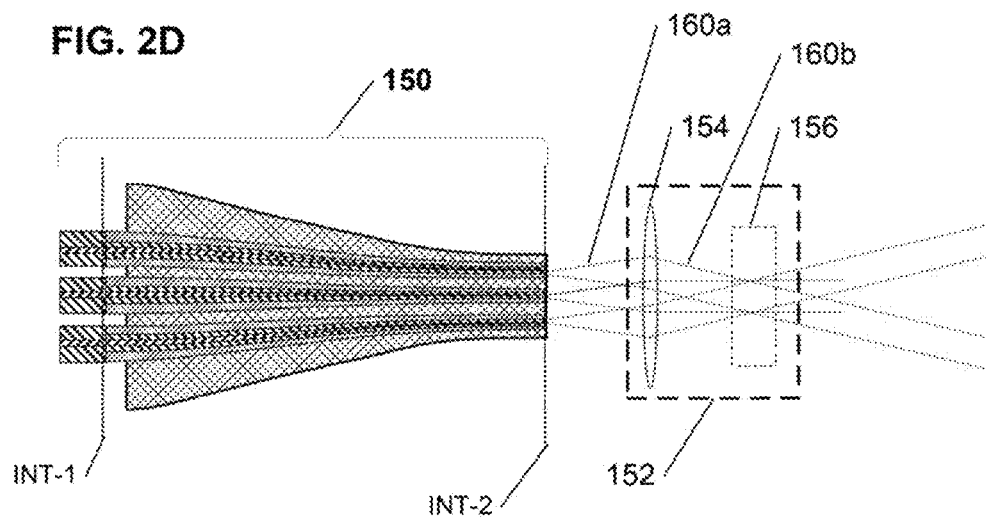

PHASE LOCKING OPTICAL FIBER COUPLER

CROSS REFERENCE TO RELATED APPLICATIONS

This application hereby incorporates by reference in their entirety the following commonly assigned issued patents (as applicable): U.S. Pat. No. 7,308,173, U.S. Pat. No. 8,326,099, and U.S. Pat. No. 8,712,199.

FIELD OF THE INVENTION

The present invention relates generally to high power single mode laser sources, and to devices for coherent combining of multiple optical fiber lasers to produce multi-kilowatt single mode laser sources, and more particularly to phase locked optical fiber components of a monolithic design that may fabricated with a very high degree of control over precise positioning of even large quantities of plural waveguides, and that are configurable for optimization of the components' fill factor (i.e., of the ratio of the mode field diameter of each waveguide at the "output" end thereof, to the distance between neighboring waveguides).

BACKGROUND OF THE INVENTION

Optical waveguide devices are indispensable in various high technology industrial applications, and especially in telecommunications. In recent years, these devices, including planar waveguides, and two or three dimensional photonic crystals are being used increasingly in conjunction with conventional optical fibers. In particular, optical waveguide devices based on high refractive index contrast or high numerical aperture (NA) waveguides are advantageous and desirable in applications in which conventional optical fibers are also utilized. However, there are significant challenges in interfacing optical high NA waveguide devices, including chiral optical fiber devices, with conventional low index contrast optical fibers. Typically, at least two major obstacles must be dealt with: (1) the difference between the sizes of the optical waveguide device and the conventional fiber (especially with respect to the differences in core sizes), and (2) the difference between the NAs of the optical waveguide device and the conventional fiber. Failure to properly address these obstacles results in increased insertion losses and a decreased coupling coefficient at each interface.

For example, conventional optical fiber based optical couplers, such as shown in FIG. 6 (Prior Art) are typically configured by inserting standard optical fibers (used as input fibers) into a capillary tube comprised of a material with a refractive index lower than the cladding of the input fibers. There are a number of significant disadvantages to this approach. For example, a fiber cladding-capillary tube interface becomes a light guiding interface of a lower quality than interfaces inside standard optical fibers and, therefore, can be expected to introduce optical loss. Furthermore, the capillary tube must be fabricated using a costly fluorine-doped material, greatly increasing the expense of the coupler.

A commonly assigned U.S. Pat. No. 7,308,173, entitled "OPTICAL FIBER COUPLER WITH LOW LOSS AND HIGH COUPLING COEFFICIENT AND METHOD OF FABRICATION THEREOF", which is hereby incorporated herein in its entirety, advantageously addressed all of the above issues by providing various embodiments of a novel optical fiber coupler capable of providing a low-loss, high-coupling coefficient interface between conventional optical fibers and optical waveguide devices.

Nevertheless, a number of challenges still remained. With the proliferation of optical devices with multiple waveguide interfaces (e.g., waveguide arrays), establishing low-loss high-accuracy connections to arrays of low or high NA waveguides often provide problematic, especially because the spacing between the waveguides is very small making coupling thereto all the more difficult. The commonly assigned U.S. Pat. No. 8,326,099, entitled "OPTICAL FIBER COUPLER ARRAY", issued Dec. 4, 2012, which is hereby incorporated herein by reference in its entirety, addressed the above challenge by providing, in at least a portion of the embodiments thereof, an optical fiber coupler array that provides a high-coupling coefficient interface with high accuracy and easy alignment between an optical waveguide device having a plurality of closely spaced high NA waveguide interfaces, and a plurality of optical fibers each having low numerical apertures separated by at least a fiber diameter. While the '099 Patent already teaches the coupler, which is capable to independently control waveguide NAs and channel-to-channel spacing, it did not specifically address the full extent of configurability with respect to interfacing with plurality of optical fibers, and with respect to adaptability of specially configured exemplary embodiments of the novel optical fiber coupler array for high power laser applications.

It is important to note that the practice of coherent combining of multiple fiber lasers has been advantageously utilized in development of multi-kilowatt single mode laser sources for a variety of applications, including, but not limited to, directed energy sources for military and defense applications, for free-space optical communications, for materials processing, and in many more industrial, scientific and even medical applications.

Combining multiple individual laser sources, versus creating a single high power laser source, allows for more efficient thermal management, which is one of the most significant limiting factor in high power laser systems. In order to achieve a coherent combination of multiple laser sources, the optical phases of the laser sources being combined must be synchronized (or "phase locked").

One of the known and commonly used approaches to accomplish passive phase locking, is to utilize the "Talbot effect", which defines a distance at which a periodic pattern recreates itself while propagating in free space. Therefore, Talbot laser cavities are used to lock the phases of Individual laser sources or amplifiers. To achieve the Talbot effect, it is critical that the array of coupled waveguides has good spatial periodicity, and that the distance from the face of a waveguide array to a reflector is precisely selected and maintained. At present, different elements of a commonly used Talbot cavity are free-space optical elements, mechanically held at predefined locations, which makes it very difficult to maintain environmental stability.

Accordingly, it would be advantageous to provide various embodiments of an inventive PROFA-based optical fiber link component that may be configured and optimized to achieve highly desirable phase locking characteristics.

BRIEF DESCRIPTION OF THE DRAWINGS

In the drawings, wherein like reference characters denote corresponding or similar elements throughout the various figures:

FIG. 1C is a schematic diagram of a side view of a third exemplary embodiment of the optical fiber coupler array of the present invention, which comprises a plurality of VC waveguides, and a plurality of Non-VC waveguides, disposed longitudinally and asymmetrically to one another, and where at least a portion of the plural Non-VC waveguides are of different types and/or different characteristics;

FIG. 1D is a schematic diagram of a side view of a fourth exemplary embodiment of the optical fiber coupler array of the present invention, configured for fan-in and fan-out connectivity and comprising a pair of novel optical fiber coupler components with a multi-core optical fiber element connected between the second (smaller sized) ends of the two optical fiber coupler components;

FIG. 2C is a schematic diagram of a side view of a seventh exemplary embodiment of the optical fiber coupler array of the present invention, which comprises a plurality of longitudinally proximal VC waveguides at least partially embedded in a single common housing structure, wherein each plural VC waveguide is spliced, at a particular third splice location, to a corresponding elongated optical device (such as an optical fiber), at least a portion of which extends outside the single common housing structure by a predetermined length, and wherein each particular third splice location is disposed outside the single common housing structure;

FIG. 2D is a schematic diagram of a side view of an alternative embodiment of the optical fiber coupler array of the present invention, comprising a plurality of longitudinally proximal VC waveguides at least partially embedded in a single common housing structure, that is configured at its second end, to optimize optical coupling to a free-space-based optical device;

DETAILED DESCRIPTION OF THE PREFERRED EMBODIMENTS

Figure 1A:
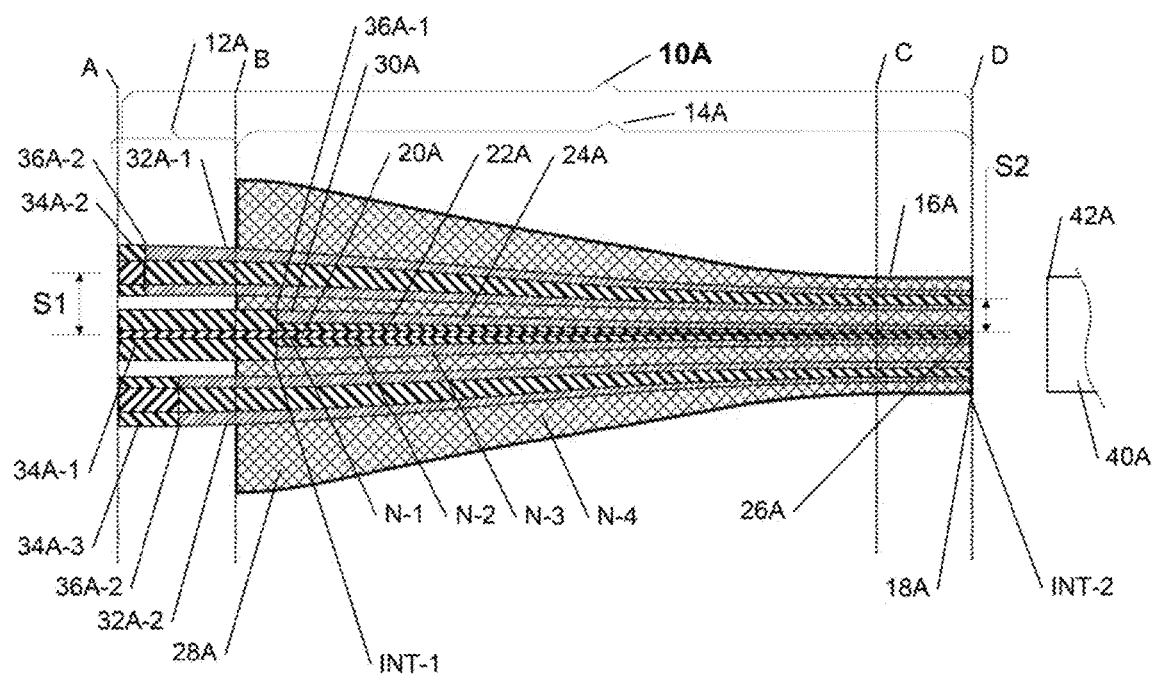
FIG. 1A is a schematic diagram of a side view of a first exemplary embodiment of the optical fiber coupler array of the present invention, which comprises at least one vanishing core waveguide (VC waveguide), illustrated therein by way of example as a single VC waveguide, and at least one Non-VC waveguide, illustrated therein by way of example as a plurality of Non-VC waveguides, disposed symmetrically proximally to the exemplary single VC waveguide.

The present invention is directed to an optical fiber coupler array capable of providing a low-loss, high-coupling coefficient interface with high accuracy and easy alignment between a plurality of optical fibers (or other optical devices) with a first channel-to-channel spacing, and an optical device having a plurality of waveguide interfaces with a second, smaller channel-to-channel spacing. Advantageously, in various embodiments of the present invention, each of a larger size end and a smaller size end of the optical fiber coupler array is configurable to have a correspondingly different (i.e., larger vs. smaller) channel-to-channel spacing, where the respective channel-to-channel spacing at each of the novel optical coupler array's larger and smaller ends may be readily matched to a corresponding respective first channel-to-channel spacing of the plural optical fibers at the larger optical coupler array end, and to a second channel-to-channel spacing of the optical device plural waveguide interfaces at the smaller optical coupler array end.

In various inventive embodiments thereof, the novel optical coupler array includes a plurality of waveguides (at least one of which may optionally be polarization maintaining), that comprises at least one gradually reduced "vanishing core fiber", at least in part embedded within a common housing structure. Alternatively, in various additional inventive embodiments thereof, the novel coupler array may be configured for utilization with at least one of an optical fiber amplifier and an optical fiber laser.

Each of the various embodiments of the optical coupler array of the present invention advantageously comprises at least one "vanishing core" (VC) fiber waveguide, described in greater detail below in connection with a VC waveguide 30A of the optical coupler array 10A of FIG. 1A.

It should also be noted that the term "optical device" as generally used herein, applies to virtually any single channel or multi-channel optical device, or to any type of optical fiber, including, but not being limited to, standard/conventional optical fibers. For example, optical devices with which the inventive coupler array may advantageously couple may include, but are not limited to, one or more of the following:

a free-space-based optical device,
an optical circuit having at least one input/output edge coupling port, an optical circuit having at least one optical port comprising vertical coupling elements,
a multi-mode (MM) optical fiber,
a double-clad optical fiber,
a multi-core (MC) optical fiber,
a large mode area (LMA) fiber,
a double-clad multi-core optical fiber,
a standard/conventional optical fiber,
a custom optical fiber, and/or
an additional optical coupler array.

In addition, while the term "fusion splice" is utilized in the various descriptions of the exemplary embodiments of the novel coupler array provided below, in reference to interconnections between various novel optical coupler array components, and connections between various novel optical coupler array components and optical device(s), it should be noted, that any other form of waveguide or other coupler array component connectivity technique or methodology may be readily selected and utilized as a matter of design choice or necessity, without departing from the spirit of the invention, including but not limited to mechanical connections.

Referring now to FIG. 1A, a first exemplary embodiment of an optical fiber coupler array of the present invention is shown as an optical coupler array 10A, which comprises a common housing structure 14A (described in greater detail below), at least one VC waveguide, shown in FIG. 1A by way of example, as a single VC waveguide 30A, and at least one Non-VC waveguide, shown in FIG. 1A by way of example, as a pair of Non-VC waveguides 32A-1, 32A-2, each positioned symmetrically proximally to one of the sides of of the exemplary single VC waveguide 30A, wherein the section of the VC waveguide 30A, located between positions B and D of FIG. 1A is embedded in the common housing structure 14A.

Before describing the coupler array 10A and its components in greater detail, it would be useful to provide a detailed overview of the inventive VC waveguide 30A, the exemplary embodiments and alternative embodiments of which, are advantageously utilized in each of the various embodiments of the inventive coupler arrays of FIGS. 1A to 5.

The VC waveguide 30A has a larger end (proximal to position B shown in FIG. 1A), and a tapered, smaller end (proximal to position C shown in FIG. 1A), and comprises an inner core 20A (composed of a material with an effective refractive index of N-1), an outer core 22A (composed of a material with an effective refractive index of N-2, smaller than N-1), and a cladding 24A (composed of a material with an effective refractive index of N-3, smaller than N-2).

Advantageously, the outer core 22A serves as the effective cladding at the VC waveguide 30A large end at which the VC waveguide 30A supports "M1" spatial propagating modes within the inner core 20A, where M1 is larger than 0. The indices of refraction N-1 and N-2, are preferably chosen so that the numerical aperture (NA) at the VC waveguide 30A large end matches the NA of an optical device (e.g. an optical fiber) to which it is connected (such as an optical device 34A-1, for example, comprising a standard/conventional optical fiber connected to the VC waveguide 30A at a connection position 36A-1 (e.g., by a fusion splice, a mechanical connection, or by other fiber connection means), while the dimensions of the inner and outer cores (20A, 22A), are preferably chosen so that the connected optical device (e.g., the optical device 34A-1), has substantially the same mode field dimensions (MFD). Here and below we use mode field dimensions instead of commonly used mode field diameter (also MFD) due to the case that the cross section of the VC or Non-VC waveguides may not be circular, resulting in a non-circular mode profile. Thus, the mode field dimensions include both the mode size and the mode shape and equal to the mode field diameter in the case of a circularly symmetrical mode.

During fabrication of the coupler array 10A from an appropriately configured preform (comprising the VC waveguide 30A preform having the corresponding inner and outer cores 20A, 22A, and cladding 24A), as the coupler array 10A preform is tapered in accordance with at least one predetermined reduction profile, the inner core 20A becomes too small to support all M1 modes. The number of spatial modes, supported by the inner core at the second (tapered) end is M2, where M2<M1. In the case of a single mode waveguide, where M1=1 (corresponding to 2 polarization modes), M2=0, meaning that inner core is too small to support light propagation. The VC waveguide 30A then acts as if comprised a fiber with a single core of an effective refractive index close to N-2, surrounded by a cladding of lower index N-3.

During fabrication of the coupler array 10A, a channel-to-channel spacing S-1 at the coupler array 10A larger end (at position B, FIG. 1A), decreases in value to a channel-to-channel spacing S-2 at the coupler array 10A smaller end (at position C, FIG. 1A), in proportion to a draw ratio selected for fabrication, while the MFD value (or the inversed NA value of the VC waveguide 30A) can be either reduced, increased or preserved depending on a selected differences in refractive indices, (N-1-N-2) and (N-2-N-3), which depends upon the desired application for the optical coupler array 10A, as described in greater detail below.

The capability of independently controlling the channel-to-channel spacing and the MFD values at each end of the inventive optical coupler array is a unique and highly advantageous feature of the present invention. Additionally, the capability to match MFD and NA values through a corresponding selection of the sizes and shapes of inner 20A and outer 22A cores and values of N-1, N-2, and N-3, makes it possible to utilize the novel optical coupler array to couple to various waveguides without the need to use a lens.

In various embodiments thereof, the property of the inventive VC waveguide permitting light to continue to propagate through the waveguide core along the length thereof when its diameter is significantly reduced, advantageously, reduces optical loss from interfacial imperfection or contamination, and allows the use of a wide range of materials for a medium 28A of the common housing structure 14A (described in greater detail below), including, but not limited to:

(a) non-optical materials (since the light is concentrated inside the waveguide core),
(b) absorbing or scattering materials or materials with refractive index larger than the refractive index of standard/conventional fibers for reducing or increasing the crosstalk between the channels, and
(c) pure-silica (e.g., the same material as is used in most standard/conventional fiber claddings, to facilitate splicing to multi-core, double-clad, or multi-mode fiber.

Preferably, in accordance with the present invention, the desired relative values of NA-1 and NA-2 (each at a corresponding end of the coupler array 10A, for example, NA-1 corresponding to the coupler array 10A large end, and NA-2 corresponding to the coupler array 10A small end), and, optionally, the desired value of each of NA-1 and NA-2), may be determined by selecting the values of the refractive indices N1, N2, and N3 of the coupler array 10A, and configuring them in accordance with at least one of the following relationships, selected based on the desired relative numerical aperture magnitudes at each end of the coupler array 10A:

| Desired NA-1/NA-2 Relative Magnitude | Corresponding Relationship bet N1, N2, N3 |
|---|---|
| NA-1 (lrg. end) > NA-2 (sm. end) | (N1 − N2 > N2 − N3) |
| NA-1 (lrg. end) = NA-2 (sm. end) | (N1 − N2 = N2 − N3) |
| NA-1 (lrg. end) < NA-2 (sm. end) | (N1− N2 < N2 − N3) |

Commonly the NA of any type of fiber is determined by the following expression:

$$NA=\sqrt{n_{core}^2-n_{clad}^2},$$

where $n_{core}$ and $n_{clad}$ are the refractive indices of fiber core and cladding respectively.

It should be noted that when the above expression is used, the connection between the NA and the acceptance angle of the fiber is only an approximation. In particular, fiber manufacturers often quote "NA" for single-mode (SM) fibers based on the above expression, even though the acceptance angle for a single-mode fiber is quite different and cannot be determined from the indices of refraction alone.

In accordance with the present invention, as used herein, the various NA values are preferably determined utilizing effective indices of refraction for both $n_{core}$ and $n_{cladding}$, because the effective indices determine the light propagation and are more meaningful in the case of structured waveguides utilized in various embodiments of the present invention. Also, a transverse refractive index profile inside a waveguide may not be flat, but rather varying around the value N1, N2, N3, or N4. In addition, the transition between regions having refractive indices N1, N2, N3, and N4 may not be as sharp as a step function due to dopant diffusion or some other intentional or non-intentional factors, and may be a smooth function, connecting the values of N1, N2, N3, and N4. Coupling optimization requires to change both the values of N1, N2, N3, and N4 and the sizes and shapes of the regions having respective indices.

Returning now to FIG. 1A, the common coupling structure 14A, comprises the medium 28A, in which the section of the VC waveguide 30A located between positions B and D of FIG. 1A is embedded, and which may include, but is not limited to, at least one of the following materials:
  a material, having properties prohibiting propagation of light therethrough,
  a material having light-absorbing optical properties,
  a material having light scattering optical properties,
  a material having optical properties selected such that said fourth refractive index (N-4) is greater than said third refractive index (N-3), and/or
  a material having optical properties selected such that said fourth refractive index (N-4) is substantially equal to said third refractive index (N-3).

At the optical coupler array 10A large end (proximally to position B in FIG. 1A), the VC waveguide 30A is spliced, at a particular splice location 36A-1 (shown by way of example as positioned inside the common housing structure 14A), to a corresponding respective elongated optical device 34A-1 (for example, such as an optical fiber), at least a portion of which extends outside the common housing structure 14A by a predetermined length 12A, while the Non-VC waveguides 32A-1, 32A-2 are spliced, at particular splice locations 36A-2, 36A-3, respectively (disposed outside of the common housing structure 104C), to corresponding respective elongated optical devices 34A-2, 34A-3 (such as optical fibers), and extending outside the common housing structure 14A by a predetermined length 12A.

Optionally, the novel coupler array 10A may also include a substantially uniform diameter tip 16A (shown between positions C and D in FIG. 1) for coupling, at an array interface 18A with the interface 42A of an optical waveguide device 40A. The uniform diameter tip 16A may be useful in certain interface applications, such as for example shown in FIGS. 1D, 4 and 5. Alternatively, the novel coupler array 10A may be fabricated without the tip 16A (or have the tip 16A removed after fabrication), such that coupling with the optical device interface 42A, occurs at a coupler array 10A interface at position C of FIG. 1A.

In an alternative embodiment of the present invention, if the optical device 40A comprises a double-clad fiber, when the small end of the coupler array 10A is coupled (for example, fusion spliced) to the optical device interface 42A, at least a portion of the common housing structure 14A proximal to the splice position (such as at least a portion of the tip 16A), may be coated with a low index medium (not shown), extending over the splice position and up to the double-clad fiber optical device 40A outer cladding (and optionally extending over a portion of the double-dad fiber optical device 40A outer cladding that is proximal to the splice position).

Figure 1B:
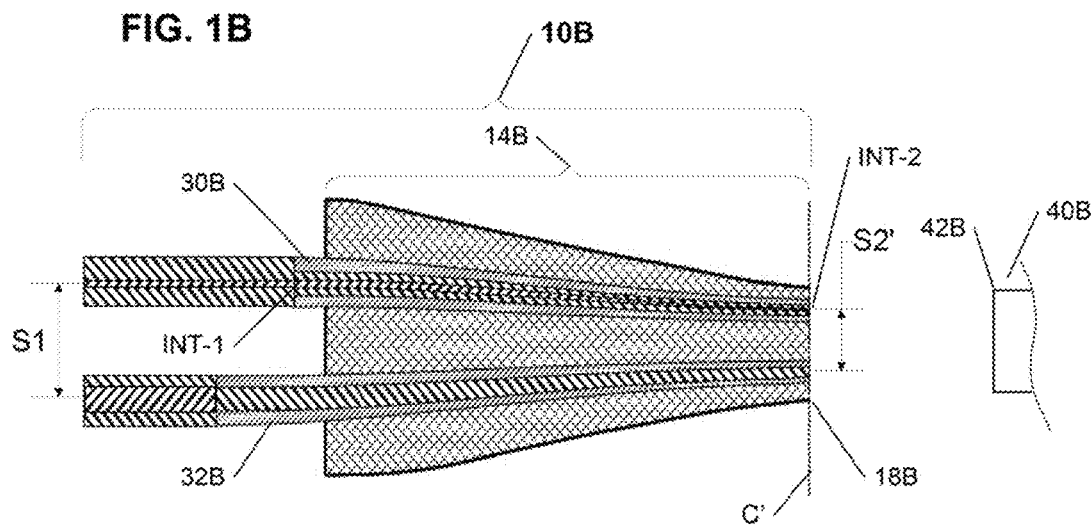
FIG. 1B is a schematic diagram of a side view of a second exemplary embodiment of the optical fiber coupler array of the present invention, which comprises at least one vanishing core waveguide (VC waveguide), illustrated therein by way of example as a single VC waveguide, and at least one Non-VC waveguide, illustrated therein by way of example as a single Non-VC waveguide, disposed in parallel proximity to the exemplary single VC waveguide, where a portion of the inventive optical fiber coupler array has been configured to comprise a higher channel-to-channel spacing magnitude at its second (smaller) end than the corresponding channel-to-channel spacing magnitude at the second end of the optical fiber coupler array of FIG. 1A.

Referring now to FIG. 1B, a second exemplary embodiment of the optical fiber coupler array of the present invention, is shown as a coupler array 10B. The coupler array 10B comprises a common housing structure 14B, at least one VC waveguide, shown in FIG. 1B by way of example, as a single VC waveguide 30B, and at least one Non-VC waveguide, shown in FIG. 1B by way of example, as a single Non-VC waveguide 32B, disposed in parallel proximity to the VC waveguide 30B, where a portion of the optical coupler array 10B, has been configured to comprise a larger channel-to-channel spacing value S2' at its small end, than the corresponding channel-to-channel spacing value S2 at the small end of the optical coupler array 10A, of FIG. 1A. This configuration may be readily implemented by transversely cutting the optical fiber array 10A at a position C', thus producing the common housing structure 14B that is shorter than the common housing structure 14A and resulting in a new, larger diameter array interface 18B, having the larger channel-to-channel spacing value S2'.

Referring now to FIG. 1C, a third exemplary embodiment of the optical fiber coupler array of the present invention, is shown as a coupler array 10C. The coupler array 10C comprises a plurality of VC waveguides, shown in FIG. 1C as VC waveguides 30C-1, and 30C-2, and a plurality of Non-VC waveguides, shown in FIG. 1C as Non-VC waveguides 32C-1, 32C-2, and 32C-a, all disposed longitudinally and asymmetrically to one another, wherein at least a portion of the plural Non-VC waveguides are of different types and/or different characteristics (such as singlemode or multimode or polarization maintaining etc)—for example, Non-VC waveguides 32C-1, 32C-2 are of a different type, or comprise different characteristics from the Non-VC waveguide 32C-a. Additionally, any of the VC or Non-VC waveguides (such as, for example, the Non-VC waveguide 32C-a) can readily extend beyond the coupler array 10C common housing structure by any desired length, and need to be spliced to an optical device proximally thereto.

Referring now to FIG. 1D, a fourth exemplary embodiment of the optical fiber coupler array of the present invention that is configured for multi-core fan-in and fan-out connectivity, and shown as a coupler array 50. The coupler array 50 comprises a pair of novel optical fiber coupler array components (10D-1 and 10D-2), with a multi-core optical fiber element 52 connected (e.g., by fusion splicing at positions 54-1 and 54-2) between the second (smaller sized) ends of the two optical fiber coupler array components (10D-1, 10D-2). Preferably, at least one of the VC waveguides in each of the coupler array components (10D-1, 10D-2) is configured to maximize optical coupling to a corresponding selected core of the multi-core optical fiber element 52, while minimizing optical coupling to all other cores thereof.

Figure 2A:
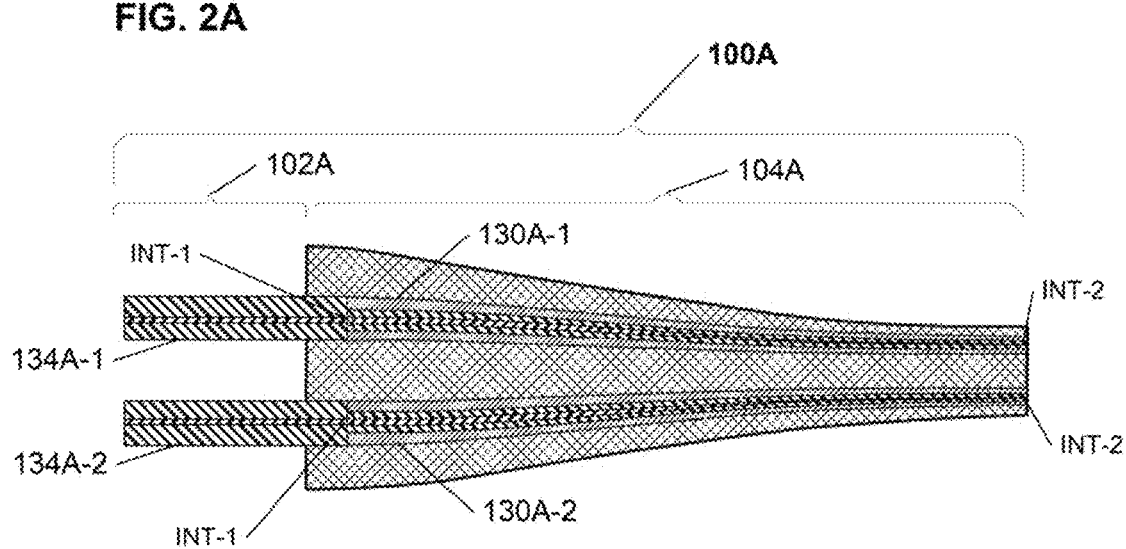
FIG. 2A is a schematic diagram of a side view of a fifth exemplary embodiment of the optical fiber coupler array of the present invention, which comprises a plurality of longitudinally proximal VC waveguides at least partially embedded in a single common housing structure, wherein each plural VC waveguide is spliced, at a particular first splice location, to a corresponding elongated optical device (such as an optical fiber), at least a portion of which extends outside the single common housing structure by a predetermined length, and wherein each particular first splice location is disposed within the single common housing structure.

Referring now to FIG. 2A, a fifth exemplary embodiment of the optical fiber coupler array of the present invention, is shown as a coupler array 100A. The coupler array 100A comprises a plurality of longitudinally proximal VC waveguides at least partially embedded in a single common housing structure 104A, shown by way of example only, as plural VC waveguides 130A-1, 130A-2. Each plural VC waveguide 130A-1, 130A-2 is spliced, at a particular splice location 132A-1, 132A-2, respectively, to a corresponding respective elongated optical device 134A-1, 134A-2 (such as an optical fiber), at least a portion of which extends outside the common housing structure 104A by a predetermined length 102A, and wherein each particular splice location 132A-1, 132A-2 is disposed within the common housing structure 104A.

Figure 2B:
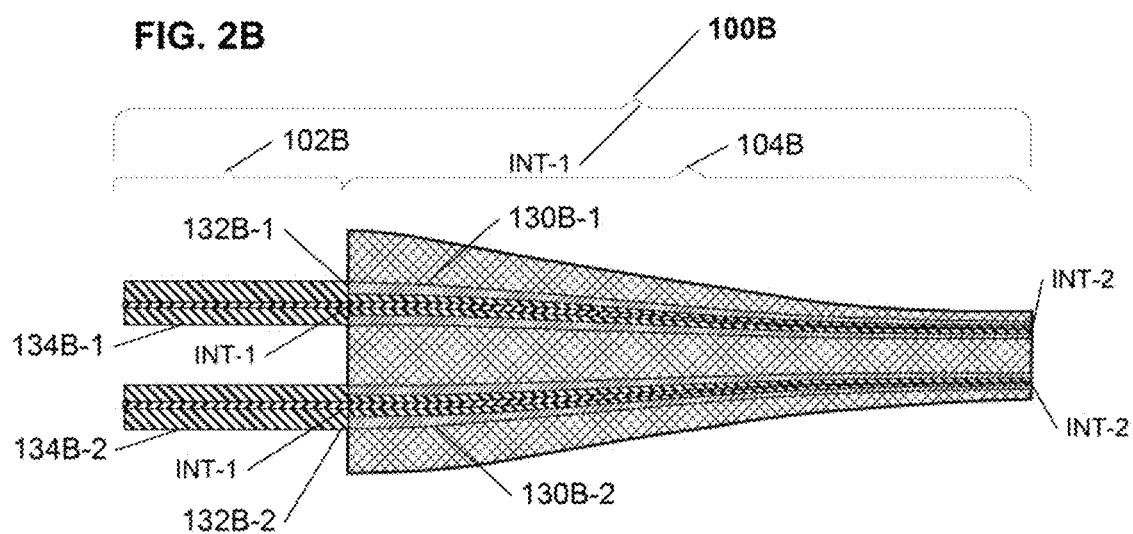
FIG. 2B is a schematic diagram of a side view of a sixth exemplary embodiment of the optical fiber coupler array of the present invention, which comprises a plurality of longitudinally proximal VC waveguides at least partially embedded in a single common housing structure, wherein each plural VC waveguide is spliced, at a particular second splice location, to a corresponding elongated optical device (such as an optical fiber), at least a portion of which extends outside the single common housing structure by a predetermined length, and wherein each particular second splice location is disposed at an outer cross-sectional boundary region of the single common housing structure.

Referring now to FIG. 2B, a sixths exemplary embodiment of the optical fiber coupler array of the present invention, is shown as a coupler array 100B. The coupler array 100B comprises a plurality of longitudinally proximal VC waveguides at least partially embedded in a single common housing structure 104B, shown by way of example only, as plural VC waveguides 130B-1, 130B-2. Each plural VC waveguide 130B-1, 130B-2 is spliced, at a particular splice location 132B-1, 132B-2, respectively, to a corresponding respective elongated optical device 134B-1, 134B-2 (such as an optical fiber), at least a portion of which extends outside the common housing structure 104B by a predetermined length 102B, and wherein each particular splice location 132B-1, 132B-2 is disposed at an outer cross-sectional boundary region of the common housing structure 104B.

Referring now to FIG. 2C, a seventh exemplary embodiment of the optical fiber coupler array of the present invention, is shown as a coupler array 100C.

The coupler array 100C comprises a plurality of longitudinally proximal VC waveguides at least partially embedded in a single common housing structure 104C, shown by way of example only, as plural VC waveguides 130C-1, 130C-2. Each plural VC waveguide 130C-1, 130C-2 is spliced, at a particular splice location 132C-1, 132C-2, respectively, to a corresponding respective elongated optical device 134C-1, 134C-2 (such as an optical fiber), at least a portion of which extends outside the common housing structure 104C by a predetermined length 102C, and wherein each particular splice location 132C-1, 132C-2 is disposed outside of the common housing structure 104C.

Referring now to FIG. 2D, an alternative embodiment of the optical fiber coupler array of the present invention, is shown as a coupler array 150. The coupler array 150 comprises a plurality of longitudinally proximal VC waveguides at least partially embedded in a single common housing structure, that is configured at its second end, to optimize optical coupling to a free-space-based optical device 152. The free-space-based optical device 152 may comprise a lens 154 followed by an additional optical device component 156, which may comprise, by way of example, a MEMS mirror or volume Bragg grating. The combination of the coupler and the free-space-based optical device 152 may be used as an optical switch or WDM device for spectral combining or splitting of light signals 160b (representative of the light coupler array 150 output light signals 160a after they have passed through the lens 154.) In this case, one of the fibers may be used as an input and all others for an output or vise versa.

Prior to describing the various embodiments of the present invention shown in FIGS. 3A to 3L in greater detail, it should be understood that whenever a "plurality" or "at least one" coupler component/element is indicated below, the specific quantity of such coupler components/elements that may be provided in the corresponding embodiment of the novel coupler array, may be selected as a matter of necessity, or design choice (for example, based on the intended industrial application of the coupler array), without departing from the spirit of the present invention. Accordingly, in the various FIGS. 3A to 3L, single or individual coupler array components/elements are identified by a single reference number, while each plurality of the coupler component/elements is identified by a reference number followed by a "(1 . . . n)" designation, with "n" being a desired number of plural coupler elements/components (and which may have a different value in any particular inventive coupler array embodiment described below).

Also, all the waveguides VC and Non-VC are shown with a circular cross-section of the inner and outer core and cladding only by example. Other shapes of the cross-sections of the inner and outer core and cladding (for example, hexagonal, rectangular or squared) may be utilized without departure from the current invention. The specific choice of shape is based on various requirements, such as channel shape of the optical device, channel positional geometry (for example, hexagonal, rectangular or square lattice), or axial polarization alignment mode.

Similarly, unless otherwise indicated below, as long as various relationships/requirements set forth below (for example, the relative volume relationship requirement set forth below with respect to optical coupler arrays 200C and 200D of FIGS. 3C and 3D, respectively, and the requirement, set forth below in connection with the coupler array 200H of FIG. 3H, that the PM VC waveguide 204H be positioned longitudinally off-centered transversely from the coupler array 200H central longitudinal axis), are adhered to, the sizes, relative sizes, relative positions and choices of composition materials, are not limited to the exemplary sizes, relative sizes, relative positions and choices of composition materials, indicated bellow in connection with the detailed descriptions of the novel coupler array embodiments of FIGS. 3A to 3L, but rather they may be selected by one skilled in the art as a matter of convenience or design choice, without departing from the spirit of the present invention.

Finally, it should be noted that each of the various single common housing structure components 202A to 202L, of the various coupler arrays 200A to 200L of FIGS. 3A to 3L, respectively, may be composed of a medium having the refractive index N-4 value in accordance with an applicable one of the above-described relationships with the values of other coupler array component refractive indices N-1, N-2, and N-3, and having properties and characteristics selected from the various contemplated exemplary medium composition parameters described above in connection with medium 28A of FIG. 1A.

Figure 3A:
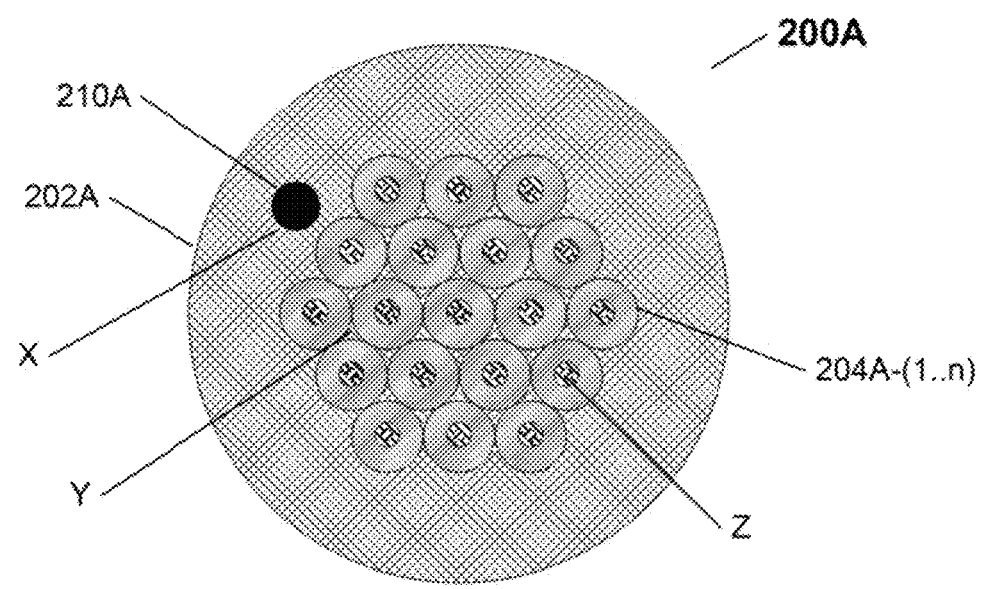
FIG. 3A is a schematic diagram of a cross-sectional view of a first alternative embodiment of the optical fiber coupler arrays of FIGS. 1D to 2D, above, and optionally comprising a fiducial element operable to provide a visual identification of waveguide arrangement/characteristics (such as alignment), which may be disposed in one of several categories of cross-sectional regions.

Referring now to FIG. 3A, a first alternative embodiment of the novel optical fiber coupler array embodiments of FIGS. 1D to 2D, is shown as a coupler array 200A in which all waveguides are VC waveguides. The coupler array 200A comprises a single common housing 202A, and plurality of VC waveguides 204A-(1 . . . n), with n being equal to 19 by way of example only, disposed centrally along the central longitudinal axis of the housing 202A. The coupler array 200A may also comprise an optional at least one fiducial element 210A, operable to provide one or more useful properties to the novel coupler array, including, but not limited to:

enabling visual identification (at at least one of the coupler array's ends) of the coupler array waveguide arrangement; and facilitating passive alignment of at least one of the inventive coupler array ends to at least one optical device.

Furthermore, when deployed in inventive optical coupler array embodiments that comprise at least one polarization maintaining VC waveguide (such as the optical coupler array embodiments described below in connection with FIGS. 3H-3L), a fiducial element is further operable to:

enable visual identification of the optical coupler array's particular polarization axes alignment mode (described in greater detail below in connection with FIGS. 3H-3L); and serve as a geometrically positioned reference point for alignment thereto, of one or more polarization axis of PM waveguides in a particular optical coupler array.

The fiducial element 210A may comprise any of the various types of fiducial elements known in the art, selected as a matter of design choice or convenience without departing from the spirit of the invention—for example, it may be a dedicated elongated element positioned longitudinally within the common housing structure 202A in one of various cross-sectional positions (such as positions X or Y, shown in FIG. 3A. Alternatively, the fiducial element 210A may comprise a dedicated channel not used for non-fiducial purposes, for example, replacing one of the waveguides 204A-(1 . . . n), shown by way of example only at position Z in FIG. 3A.

Figure 3B:
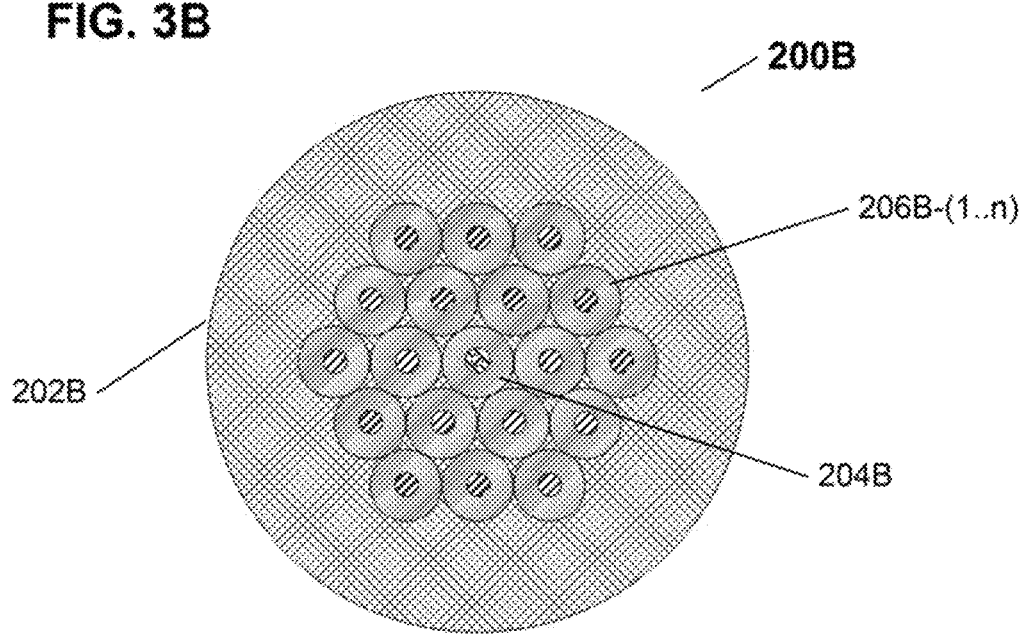
FIG. 3B is a schematic diagram of a cross-sectional view of a first alternative embodiment of the optical fiber coupler array of FIG. 1A, above, in which at least one VC waveguide, illustrated therein by way of example as a single VC waveguide, is positioned along a central longitudinal axis of the single common housing structure, and surrounded by a plurality of parallel proximal symmetrically positioned Non-VC waveguides.

Referring now to FIG. 3B, a first alternative embodiment of the novel optical fiber coupler array 10A of FIG. 1A, above, is shown as a coupler array 200B, that comprises a single housing structure 202B, and at least one VC waveguide, shown in FIG. 3B by way of example as a VC waveguide 204B, and a plurality of Non-VC waveguides 206B-(1 . . . n), with n being equal to 18 by way of example only. The VC waveguide 204B is positioned along a central longitudinal axis of the common housing structure 202B, and circumferentially and symmetrically surrounded by proximal parallel plural Non-VC waveguides 206B-(1 . . . n).

Figure 3C:
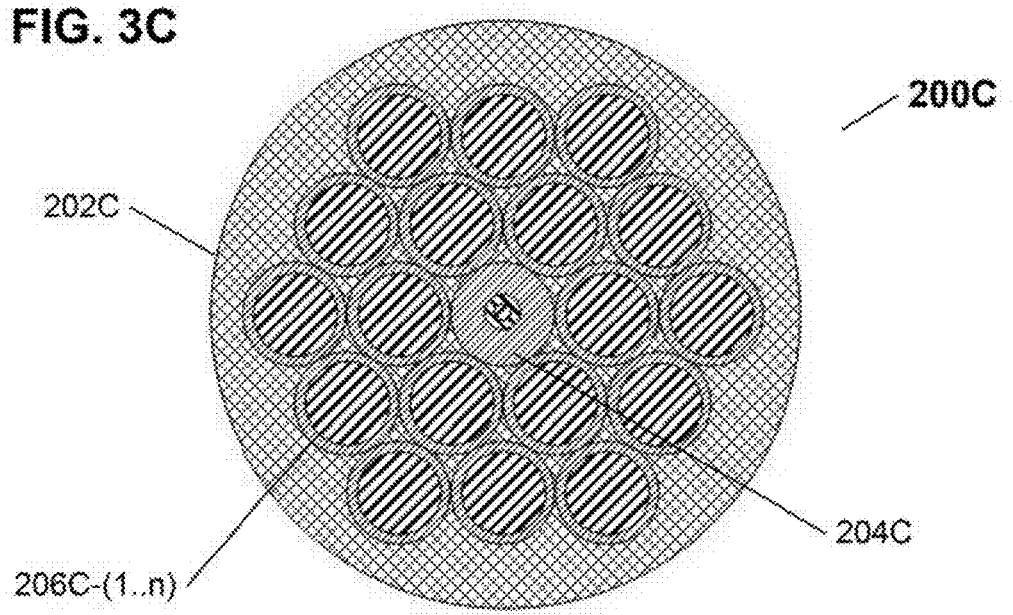
FIG. 3C is a schematic diagram of a cross-sectional view of a first alternative embodiment of the optical fiber coupler array of FIG. 3B above, in which a volume of the single common housing structure medium surrounding the sections of all of the waveguides embedded therein, exceeds a total volume of the inner and outer cores of the section of the VC waveguide that is embedded within the single common housing structure.

Referring now to FIG. 3C, a first alternative embodiment of the novel optical fiber coupler array 200B of FIG. 3B, above, is shown as a coupler array 200C that comprises a single housing structure 202C, a VC waveguide 204C, and a plurality of Non-VC waveguides 206C-(1 . . . n), with n being equal to 18 by way of example only. The VC waveguide 204C is positioned along a central longitudinal axis of the common housing structure 202C, and circumferentially and symmetrically surrounded by proximal parallel plural Non-VC waveguides 206C-(1 . . . n). The coupler array 200C is configured such that a volume of the common housing structure 202C medium, surrounding the sections of all of the waveguides embedded therein (i.e., the VC waveguide 204C and the plural Non-VC waveguides 206C-(1 . . . n)), exceeds a total volume of the inner and outer cores of the section of the VC waveguide 204C that is embedded within the single common housing structure 202C.

Figure 3D:
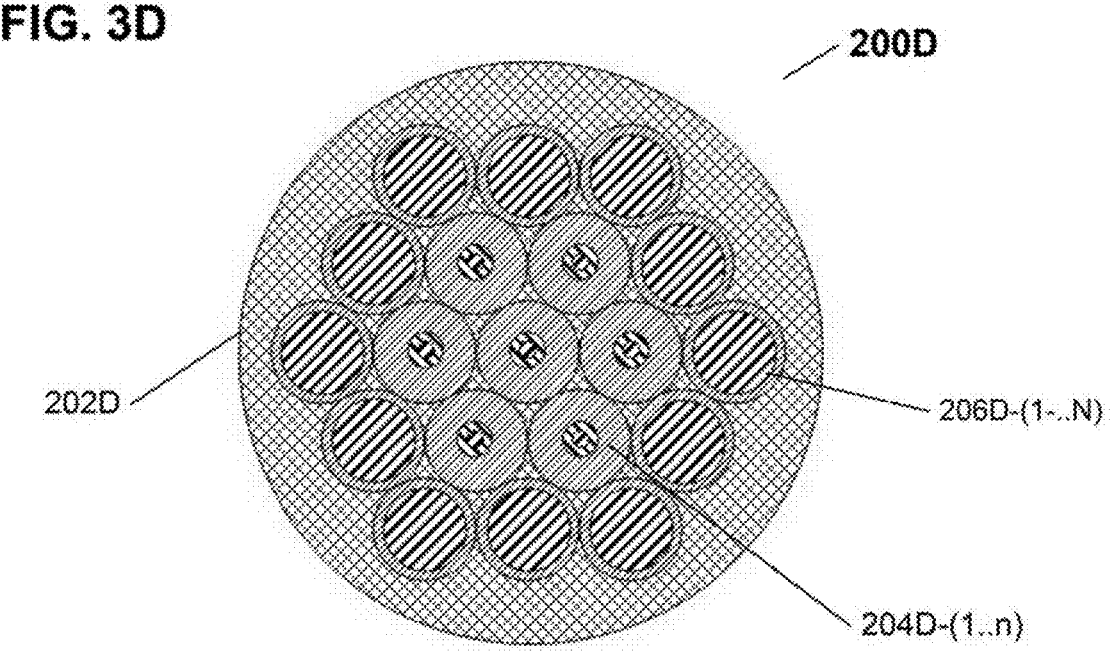
FIG. 3D is a schematic diagram of a cross-sectional view of a second alternative embodiment of the optical fiber coupler array of FIG. 3B above, in which the at least one VC waveguide positioned along the central longitudinal axis of the single common housing structure comprises a plurality of VC waveguides, and in a volume of the single common housing structure medium surrounding the sections of all of the waveguides embedded therein, exceeds a total volume of the inner and outer cores of the sections of the plural VC waveguides that are embedded within the single common housing structure.

Referring now to FIG. 3D, a first alternative embodiment of the novel optical fiber coupler array 200C of FIG. 3C, above, is shown as a coupler array 200D that comprises a single housing structure 202D, a plurality of VC waveguides 204D-(1-N), with N being equal to 7 by way of example only, and a plurality of Non-VC waveguides 206D-(1 . . . n), with n being equal to 12 by way of example only. The plural VC waveguides 204D-(1-N) are positioned along a central longitudinal axis of the common housing structure 202D, and circumferentially and symmetrically surrounded by proximal parallel plural Non-VC waveguides 206D-(1 . . . n). The coupler array 200D is configured such that a volume of the common housing structure 202D medium, surrounding the sections of all of the waveguides embedded therein (i.e., the plural VC waveguides 204D-(1-N), and the plural Non-VC waveguides 206D-(1 . . . n)), exceeds a total volume of the inner and outer cores of the section of the plural VC waveguides 204D-(1-N) that are embedded within the single common housing structure 202D.

Figure 3E:
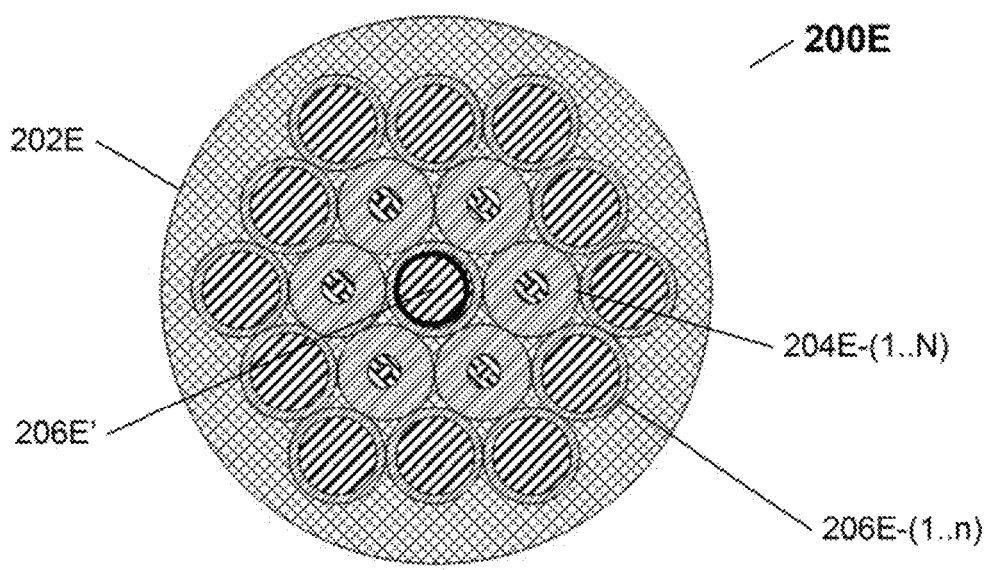
FIG. 3E is a schematic diagram of a cross-sectional view of a first alternative embodiment of the optical fiber coupler array of FIG. 3D, further comprising a central waveguide channel operable to provide optical pumping functionality therethrough.

Referring now to FIG. 3E, a first alternative embodiment of the novel optical fiber coupler array 200D of FIG. 3D, above, is shown as a coupler array 200E, that comprises a single housing structure 202E, a plurality of VC waveguides 204E-(1-N), with N being equal to 7 by way of example only, a plurality of Non-VC waveguides 206E-(1 . . . n), with n being equal to 11 by way of example only, and a separate single Non-VC waveguide 206E'. The Non-VC waveguide 206E', is preferably operable to provide optical pumping functionality therethrough, and is positioned along a central longitudinal axis of the common housing structure 202E and circumferentially and symmetrically surrounded by proximal parallel plural VC waveguides 204E-(1-N), that are in turn circumferentially and symmetrically surrounded by proximal parallel plural Non-VC waveguides 206E-(1 . . . n).

Figure 3F:
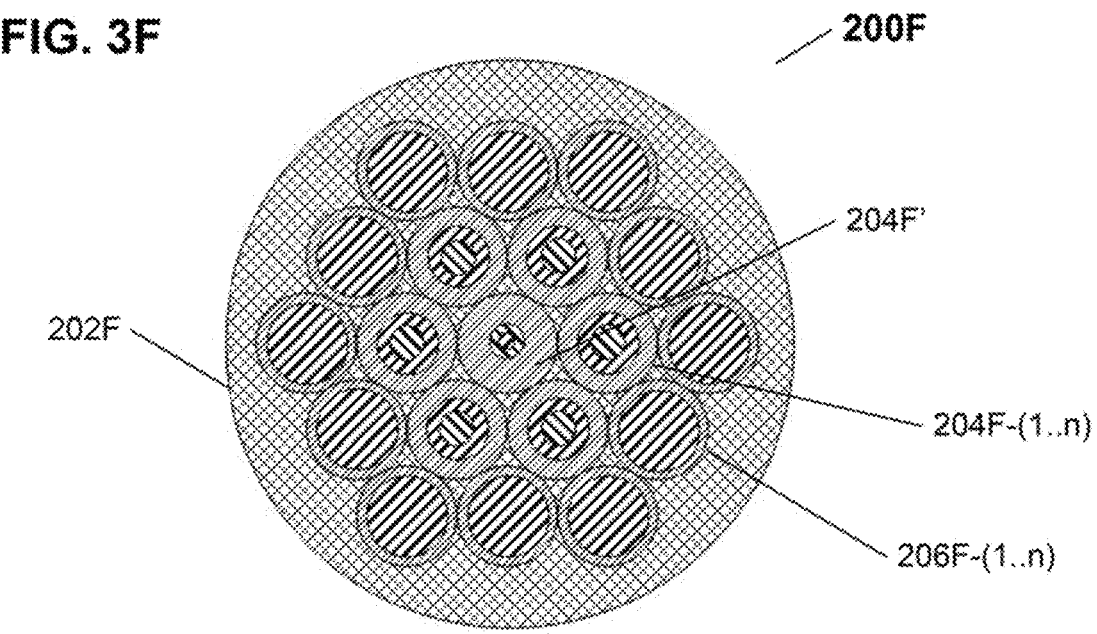
FIG. 3F is a schematic diagram of a cross-sectional view of a second alternative embodiment of the optical fiber coupler array of FIG. 3D, in which the plural VC waveguide that is positioned along the central longitudinal axis of the single common housing structure, is of a different type, and/or comprises different characteristics from the remaining plural VC waveguides, which, if selected to comprise enlarged inner cores, may be advantageously utilized for optimizing optical coupling to different types of optical pump channels of various optical devices.

Referring now to FIG. 3F, a second alternative embodiment of the novel optical fiber coupler array 200B of FIG. 3B, above, is shown as a coupler array 200F, that comprises a single housing structure 202F, a plurality of VC waveguides 204F-(1-N), with N being equal to 6 by way of example only, a separate single VC waveguide 204F', and a plurality of Non-VC waveguides 206F-(1 . . . n), with n being equal to 12 by way of example only, that preferably each comprise enlarged inner cores of sufficient diameter to optimize optical coupling to different types of optical pump channels of various optical devices, to which the coupler array 200F may be advantageously coupled. The VC waveguide 204F', is positioned along a central longitudinal axis of the common housing structure 202F, and circumferentially and symmetrically surrounded by proximal parallel plural VC waveguides 204F-(1-N), that are in turn circumferentially and symmetrically surrounded by proximal parallel plural Non-VC waveguides 206F-(1 . . . n).

Figure 3G:
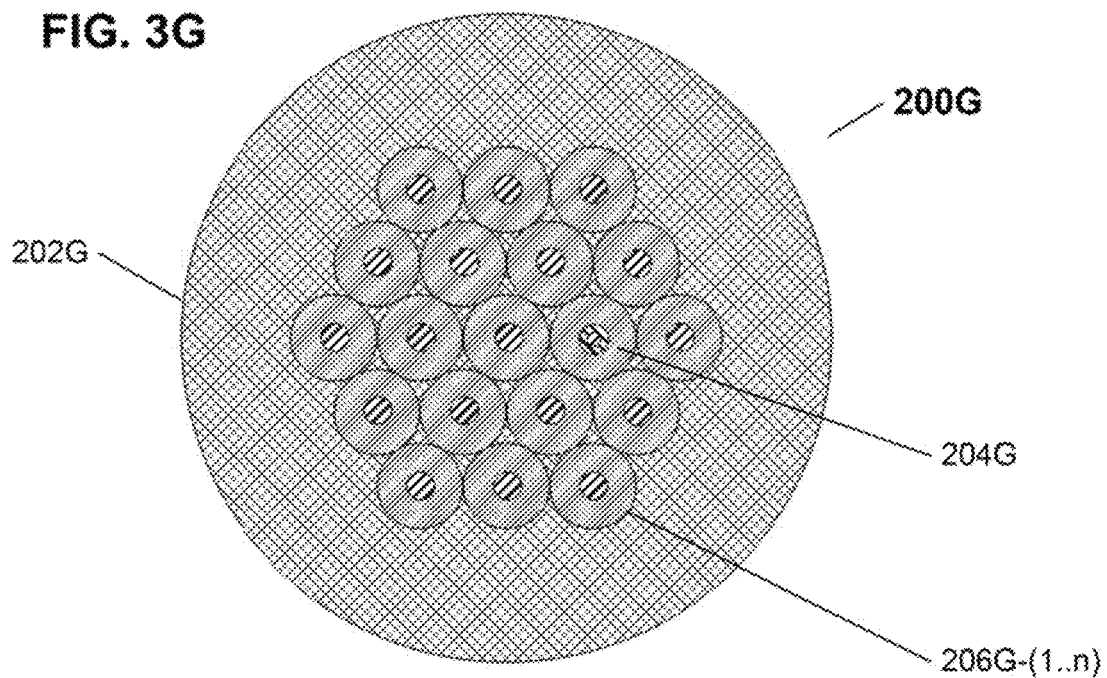
FIG. 3G is a schematic diagram of a cross-sectional view of a third alternative embodiment of the optical fiber coupler array of FIG. 3B above, in which at least one VC waveguide, illustrated therein by way of example as a single VC waveguide, is positioned as a side-channel, off-set from the central longitudinal axis of the single common housing structure, such that this embodiment of the inventive optical fiber coupler array may be readily used as a fiber optical amplifier and or a laser, when spliced to a double-clad optical fiber having a non-concentric core for improved optical pumping efficiency.

Referring now to FIG. 3G, a third alternative embodiment of the novel optical fiber coupler array 200B of FIG. 3B, above, is shown as a coupler array 200G, that comprises a single housing structure 202G, and at least one VC waveguide, shown in FIG. 3G by way of example as a VC waveguide 204G, and a plurality of Non-VC waveguides 206G-(1 . . . n), with n being equal to 18 by way of example only. The VC waveguide 204G is positioned as a side-channel, off-set from the central longitudinal axis of the single common housing structure 202G, such that optical fiber coupler array 200G may be readily used as a fiber optical amplifier and or a laser, when spliced to a double-clad optical fiber (not shown) having a non-concentric core for improved optical pumping efficiency. It should be noted that because a double-dad fiber is a fiber in which both the core and the inner cladding have light guiding properties, most optical fiber types, such as SM, MM, LMA, or MC (multi-core), whether polarization maintaining or not, and even standard (e.g., conventional) single mode optical fibers, can be converted into a double-clad fiber by coating (or recoating) the fiber with a low index medium (forming the outer cladding).

Optionally, when the second end of the coupler array 200G is spliced to a double-clad fiber (non shown), at least a portion of the common housing structure 202G proximal to the splice point with the double-clad fiber (not-shown), may be coated with a low index medium extending over the splice point and up to the double-clad fiber's outer cladding (and optionally extending over a portion of the outer cladding that is proximal to the splice point)

Referring now to FIGS. 3H to 3L, in various alternative exemplary embodiments of the optical coupler of the present invention, at least one of the VC waveguides utilized therein, and, in certain embodiments, optionally at least one of the Non-VC waveguides, may comprise a polarization maintaining (PM) property. By way of example, the PM property of a VC waveguide may result from a pair of longitudinal stress rods disposed within the VC waveguide outside of its inner core and either inside, or outside, of the outer core (or through other stress elements), or the PM property may result from a noncircular inner or outer core shape, or from other PM-inducing optical fiber configurations (such as in bow-tie or elliptically clad PM fibers). In various embodiments of the inventive optical fiber in which at least one PM waveguide (VC and/or Non-VC) is utilized, an axial alignment of the PM waveguides (or waveguide), in accordance with a particular polarization axes alignment mode may be required.

Figure 3H:
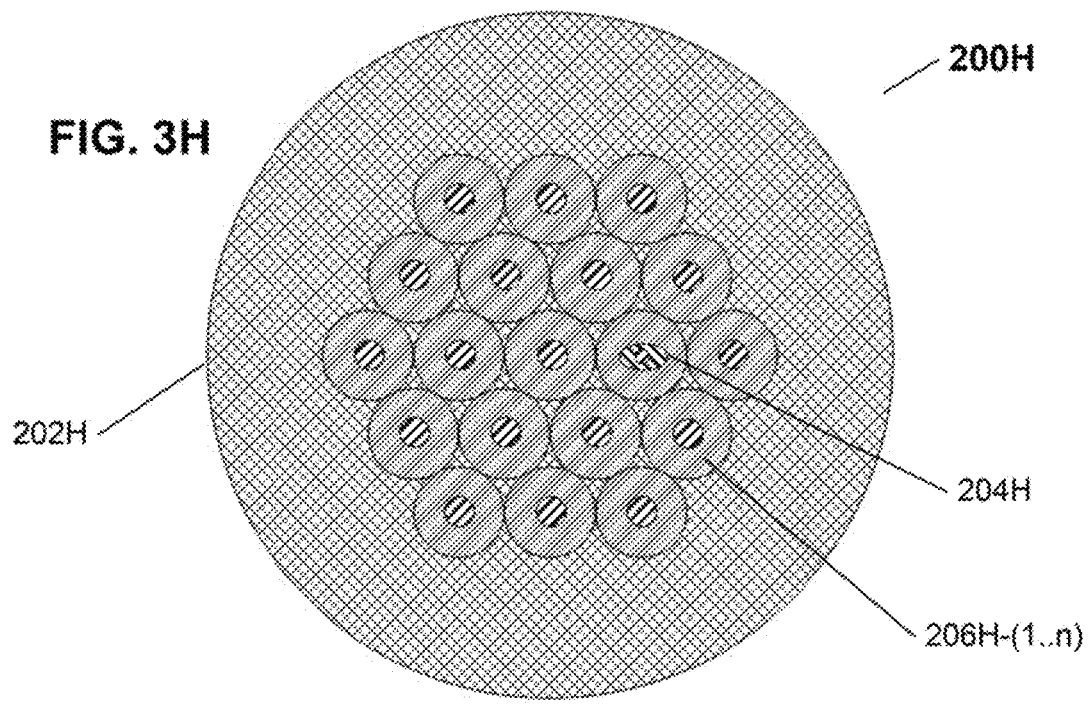
FIG. 3H is a schematic diagram of a cross-sectional view of a first alternative embodiment of the optical fiber coupler array of FIG. 3G, above, in which the at least one VC waveguide, illustrated therein by way of example as a side-channel off-center positioned single VC waveguide, comprises polarization maintaining properties and comprises a polarization axis that is aligned with respect to its transverse off-center location.
Figure 3I:
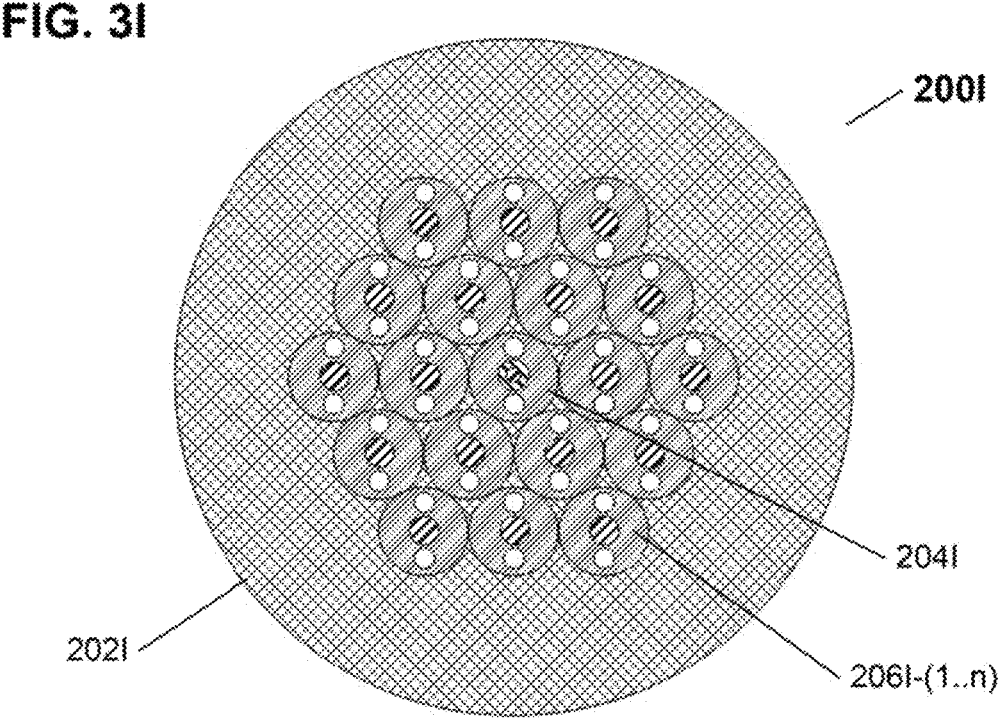
FIG. 3I is a schematic diagram of a cross-sectional view of a fourth alternative embodiment of the optical fiber coupler array of FIG. 3B, above, wherein each of the centrally positioned single VC waveguide, and the plural Non-VC waveguides, comprises polarization maintaining properties (shown by way of example only as being induced by rod stress members (and which may readily and alternately be induced by various other stress or equivalent means)), and a corresponding polarization axis, where all of the polarization axes are aligned to one another.
Figure 3J:
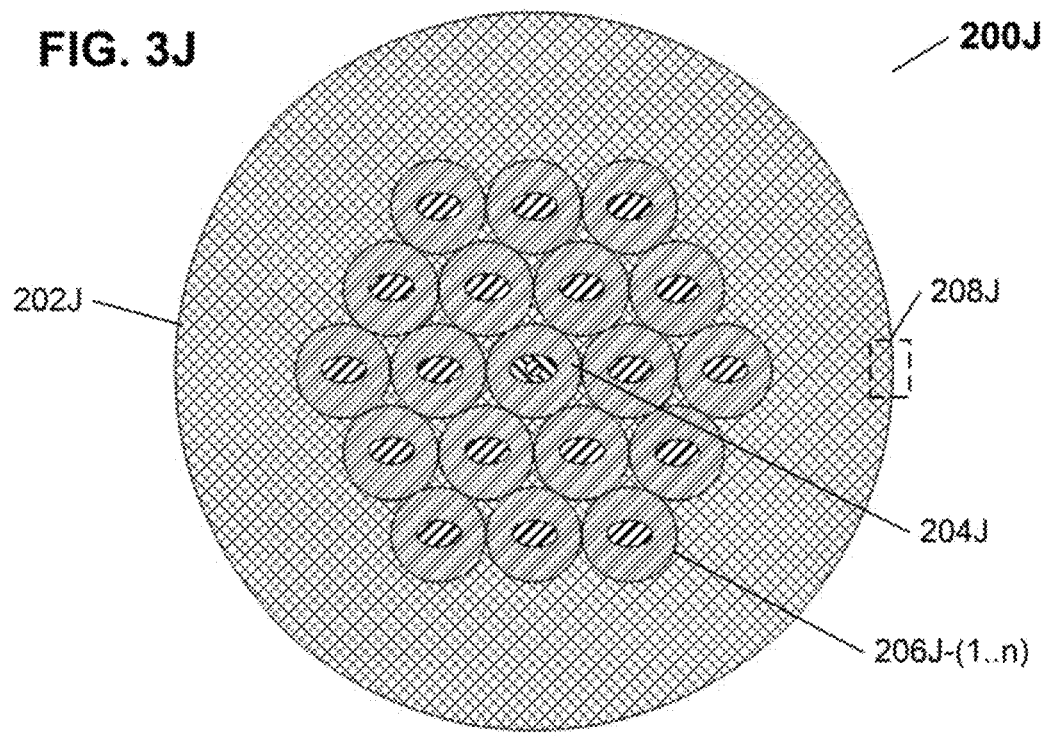
FIG. 3J is a schematic diagram of a cross-sectional view of a first alternative embodiment of the optical fiber coupler array of FIG. 3I, above, in which the polarization maintaining properties of all of the waveguides result only from a non-circular cross-sectional shape of each waveguide's core (or outer core in the case of the VC waveguide), shown by way of example only as being at least in part elliptical, and optionally comprising at least one waveguide arrangement indication element, positioned on an outer region of the single common housing structure, representative of the particular cross-sectional geometric arrangement of the optical coupler array's waveguides, such that a particular cross-sectional geometric waveguide arrangement may be readily identified from at least one of a visual and physical inspection of the single common coupler housing structure, the waveguide arrangement indication element being further operable to facilitate passive alignment of a second end of the optical coupler array to at least one optical device.
Figure 3K:
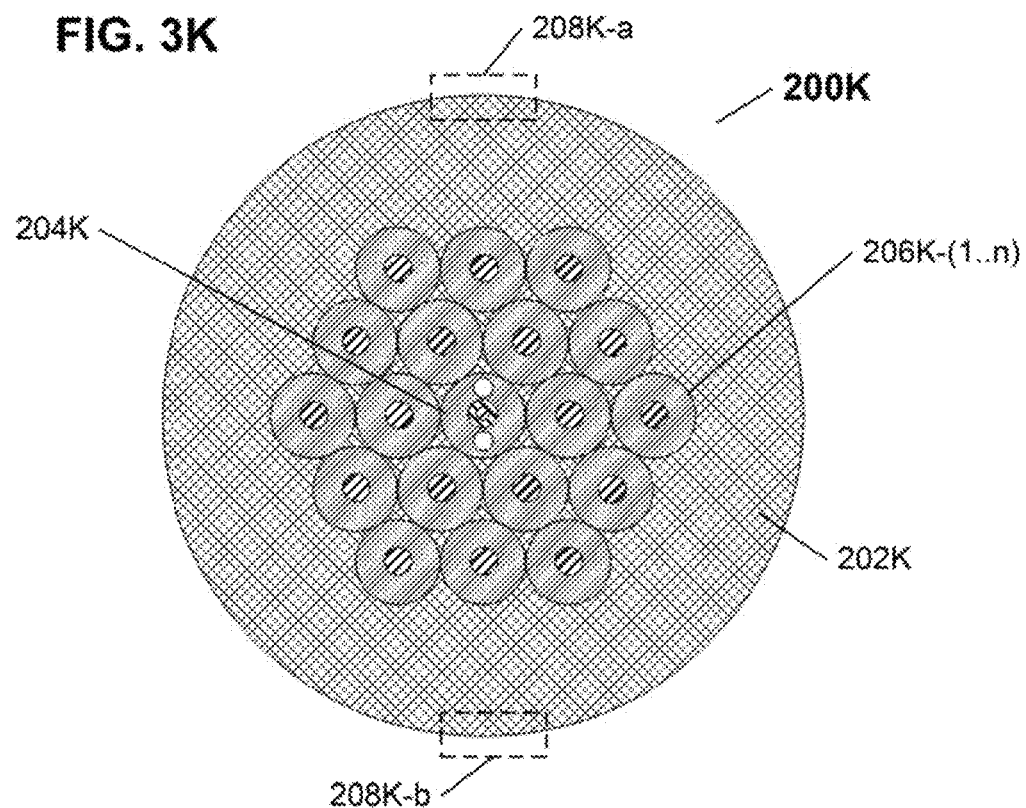
FIG. 3K is a schematic diagram of a cross-sectional view of a fifth alternative embodiment of the optical fiber coupler array of FIG. 3B, above, wherein the centrally positioned single VC waveguide, comprises polarization maintaining properties (shown by way of example only as being induced by rod stress members (and which may readily and alternately be induced by various other stress or equivalent means)), and a corresponding polarization axis, and optionally comprising a plurality of optional waveguide arrangement indication elements of the same or of a different type, as described in greater detail in connection with FIG. 3J.
Figure 3L:
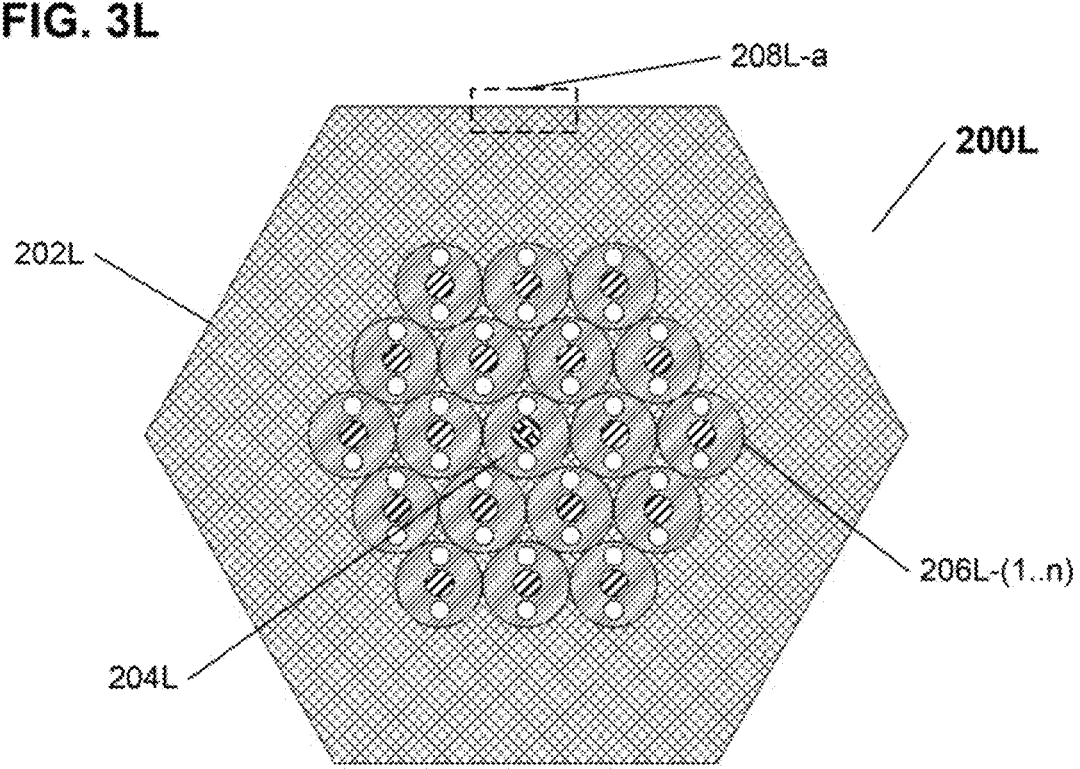
FIG. 3L is a schematic diagram of a cross-sectional view of a second alternative embodiment of the optical fiber coupler array of FIG. 3I, above, in which the single common housing structure comprises a cross section having a non-circular geometric shape (shown by way of example as a hexagon), and in which the polarization axes of the waveguides are aligned to one another and to the single common housing structure cross-section's geometric shape, and optionally further comprises a waveguide arrangement indication element, as described in greater detail in connection with FIG. 3J.

In accordance with the present invention, a polarization axes alignment mode may comprise, but is not limited to, at least one of the following:
- axial alignment of a PM waveguide's polarization axis to the polarization axes of other PM waveguides in the optical coupler;
- when a PM waveguide is positioned off-center, axial alignment of a PM waveguide's polarization axis to its transverse cross-sectional (geometric) position within the optical coupler;
- when the single common housing structure of the optical coupler comprises a non-circular geometric shape (such as shown by way of example in FIG. 3L): axial alignment of a PM waveguide's polarization axis to a geometric feature of the common housing structure outer shape;
- in optical coupler embodiments comprising one or more waveguide arrangement indicators, described in greater detail below, in connection with FIGS. 3J-3L: axial alignment of a PM waveguide's polarization axis to at least one geometric characteristic thereof;
- in optical coupler embodiments comprising at least one fiducial element 210A, as described in greater detail above in connection with FIG. 3A: axial alignment of a PM waveguide's polarization axis to a geometric position of the at least one fiducial element 210A;

The selection of a specific type of polarization axes alignment mode for the various embodiments of the inventive optical coupler is preferably governed by at least one axes alignment criterion, which may include, but which is not limited to: alignment of PM waveguides' polarization axes in a geometric arrangement that maximizes PM properties thereof; and/or satisfying at least one requirement of one or more intended industrial application for the novel coupler array.

Referring now to FIG. 3H, a first alternative embodiment of the novel optical fiber coupler array 200G of FIG. 3G, above, is shown as a coupler array 200H, that comprises a single housing structure 202H, and at least one VC waveguide, shown in FIG. 3H by way of example as a PM VC waveguide 204H having polarization maintaining properties, and a plurality of Non-VC waveguides 206H-(1 ... n), with n being equal to 18 by way of example only. The PM VC waveguide 204H is positioned as a side-channel, off-set from the central longitudinal axis of the single common housing structure 202H, and comprises a polarization axis that is aligned, by way of example, with respect to the transverse off-center location of the PM VC waveguide 204H.

Referring now to FIG. 3I, a fourth alternative embodiment of the novel optical fiber coupler array 200B of FIG. 3B, above, is shown as a coupler array 200I, that comprises a single housing structure 202I, and at least one VC waveguide, shown in FIG. 3I by way of example as a PM VC waveguide 204I having polarization maintaining properties, and a plurality of PM Non-VC waveguides 206I-(1 ... n), with n being equal to 18 by way of example only, each also having polarization maintaining properties. The PM VC waveguide 204I is positioned along a central longitudinal axis of the common housing structure 202I, and circumferentially and symmetrically surrounded by proximal parallel plural PM Non-VC waveguides 206I-(1 ... n). By way of example, the coupler array 200I comprises a polarization axes alignment mode in which the polarization axes of each of the PM VC waveguide 204I and of the plural PM Non-VC waveguides 206I-(1 ... n) are aligned to one another. The PM properties of the PM VC waveguide 204I and of the plural PM Non-VC waveguides 206I-(1 ... n) are shown, by way of example only, as being induced by rod stress members (and which may readily and alternately be induced by various other stress, or equivalent means)).

Referring now to FIG. 3J, a first alternative embodiment of the novel optical fiber coupler array 200I of FIG. 3I, above, is shown as a coupler array 200J, that comprises a single housing structure 202J, and at least one VC waveguide, shown in FIG. 3J by way of example as a PM VC waveguide 204J having polarization maintaining properties, and a plurality of PM Non-VC waveguides 206J-(1 ... n), with n being equal to 18 by way of example only, each also having polarization maintaining properties. The PM VC waveguide 204J is positioned along a central longitudinal axis of the common housing structure 202J, and circumferentially and symmetrically surrounded by proximal parallel plural PM Non-VC waveguides 206J-(1 ... n). The PM properties of the PM VC waveguide 204J and of the plural PM Non-VC waveguides 206J-(1 ... n) are shown, by way of example only, as resulting only from a non-circular cross-sectional shape (shown by way of example only as being at least in part elliptical), of each plural PM Non-VC waveguide 206J-(1 ... n) core (and from a non-circular cross-sectional shape of the outer core of the PM VC waveguide 204J).

The coupler array 200J optionally comprises at least one waveguide arrangement indication element 208J, positioned on an outer region of the common housing structure 202J, that is representative of the particular cross-sectional geometric arrangement of the optical coupler array 200J waveguides (i.e., of the PM VC waveguide 204J and of the plural PM Non-VC waveguides 206J-(1 . . . n)), such that a particular cross-sectional geometric waveguide arrangement may be readily identified from at least one of a visual and physical inspection of the common coupler housing structure 202J that is sufficient to examine the waveguide arrangement indication element 208J. Preferably, the waveguide arrangement indication element 208J may be configured to be further operable to facilitate passive alignment of a second end of the optical coupler array 200J to at least one optical device (not shown).

The waveguide arrangement indication element 208J, may comprise, but is not limited to, one or more of the following, applied to the common housing structure 202J outer surface: a color marking, and/or a physical indicia (such as an groove or other modification of the common housing structure 202J outer surface, or an element or other member positioned thereon). Alternatively, the waveguide arrangement indication element 208J may actually comprise a specific modification to, or definition of, the cross-sectional geometric shape of the common housing structure 202J (for example, such as a hexagonal shape of a common housing structure 202L of FIG. 3L, below, or another geometric shape).

By way of example, the coupler array 200J may comprise a polarization axes alignment mode in which the polarization axes of each of the PM VC waveguide 204J and of the plural PM Non-VC waveguides 206J-(1 . . . n) are aligned to one another, or to the waveguide arrangement indication element 208J.

Referring now to FIG. 3K, a fifth alternative embodiment of the novel optical fiber coupler array 200B of FIG. 3B, above, is shown as a coupler array 200K, that comprises a single housing structure 202K, and at least one VC waveguide, shown in FIG. 3K by way of example as a PM VC waveguide 204K having polarization maintaining properties, and a plurality of Non-VC waveguides 206K-(1 . . . n), with n being equal to 18 by way of example only. The PM VC waveguide 204K is positioned along a central longitudinal axis of the common housing structure 202K, and circumferentially and symmetrically surrounded by proximal parallel plural PM Non-VC waveguides 206K-(1 . . . n). The PM properties of the PM VC waveguide 204K are shown, by way of example only, as being induced by rod stress members (and which may readily and alternately be induced by various other stress, or equivalent means)). The coupler array 200K, may optionally comprise a plurality of waveguide arrangement indication elements—shown by way of example only, as waveguide arrangement indication elements 208K-a and 208K-b, which may each be of the same, or of a different type, as described in greater detail above, in connection with the waveguide arrangement indication element 208J of FIG. 3J.

Referring now to FIG. 3L, a second alternative embodiment of the optical fiber coupler array 200I of FIG. 3I, above, is shown as a coupler array 200L, that comprises a single housing structure 202L comprising a cross section having a non-circular geometric shape (shown by way of example as a hexagon), and at least one VC waveguide, shown in FIG. 3L by way of example as a PM VC waveguide 204L having polarization maintaining properties, and a plurality of PM Non-VC waveguides 206L-(1 . . . n), with n being equal to 18 by way of example only, each also having polarization maintaining properties. The PM VC waveguide 204L is positioned along a central longitudinal axis of the common housing structure 202L, and circumferentially and symmetrically surrounded by proximal parallel plural PM Non-VC waveguides 206L-(1 . . . n).

By way of example, the coupler array 200L comprises a polarization axes alignment mode in which the polarization axes of each of the PM VC waveguide 204L and of the plural PM Non-VC waveguides 206L-(1 . . . n) are aligned to one another, and to the common housing structure 202L cross-sectional geometric shape. The PM properties of the PM VC waveguide 204L and of the plural PM Non-VC waveguides 206L-(1 . . . n) are shown, by way of example only, as being induced by rod stress members (and which may readily and alternately be induced by various other stress, or equivalent means)). The coupler array 200K, may optionally comprise a waveguide arrangement indication element 208L-a which may comprise any of the configurations described in greater detail above, in connection with the waveguide arrangement indication element 208J of FIG. 3J.

Figure 4:
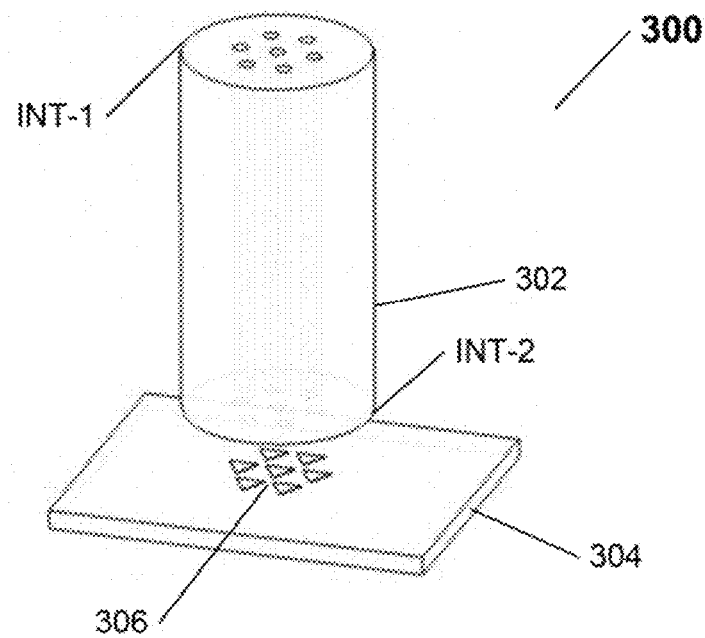
FIG. 4 is a schematic isometric view diagram illustrating an exemplary connection of a second end (i.e. "tip") of the inventive optical fiber coupler array, in the process of connecting to plural vertical coupling elements of an optical device in a proximal open air optical coupling alignment configuration, that may be readily shifted into a butt-coupled configuration through full physical contact of the inventive optical fiber coupler array second end and the vertical coupling elements.

Referring now to FIG. 4, a second end 302 (i.e. "tip") of the inventive optical fiber coupler array is shown, by way of example, as being in the process of connecting to plural vertical coupling elements 306 of an optical device 304 in a proximal open air optical coupling alignment configuration, that may be readily shifted into a butt-coupled configuration through full physical contact of the inventive optical fiber coupler array second end 302 and the vertical coupling elements 306.

Figure 5:
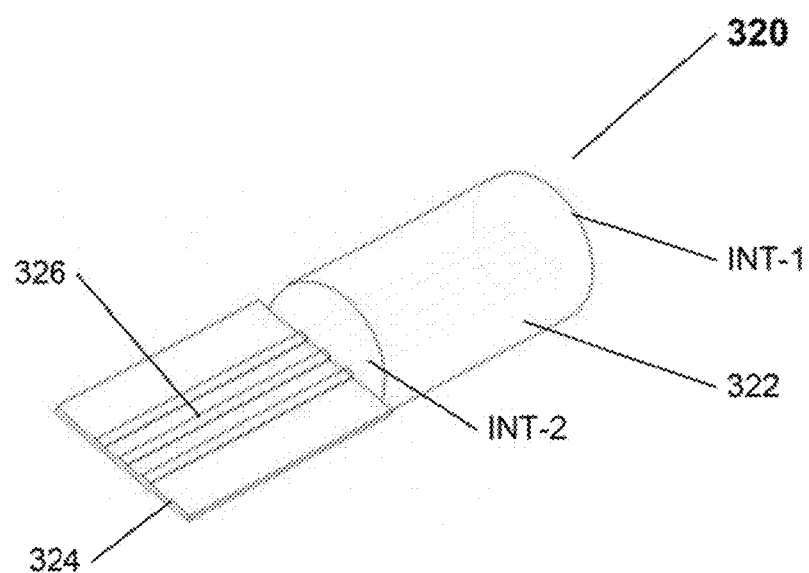
FIG. 5 is a schematic isometric view diagram illustrating an exemplary connection of a second end (i.e. "tip") of the inventive optical fiber coupler array connected to plural edge coupling elements of an optical device in a butt-coupled configuration, that may be readily shifted into one of several alternative coupling configuration, including a proximal open air optical coupling alignment configuration, and or an angled alignment coupling configuration.
Figure 6:
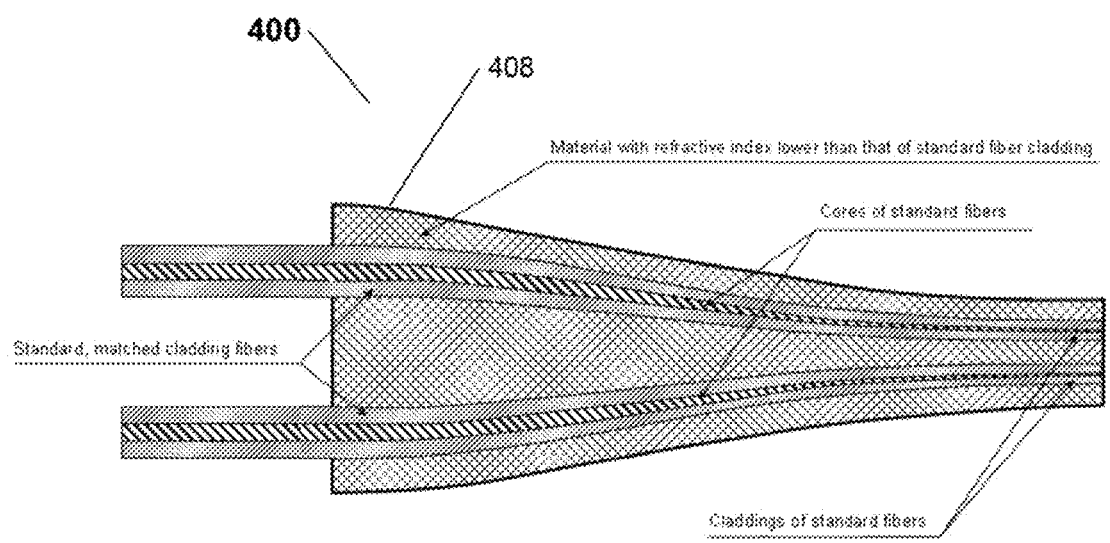
FIG. 6 is a schematic diagram of a cross-sectional view of a previously known optical fiber coupler having various drawbacks and disadvantages readily overcome by the various embodiments of the inventive optical fiber coupler array of FIGS. 1A to 5.

Referring now to FIG. 5 a second end 322 (i.e. "tip") of the inventive optical fiber coupler array is shown, by way of example, as being in the process of connecting to plural edge coupling elements 326 of an optical device 324 in a butt-coupled configuration, that may be readily shifted into one of several alternative coupling configuration, including a proximal open air optical coupling alignment configuration, and or an angled alignment coupling configuration.

In at least one alternative embodiment of the present invention, the inventive optical coupler array (i.e., such as optical coupler arrays 200D to 200L of FIGS. 3C to 3L) may be readily configured to pump optical fiber lasers, and/or optical fiber amplifiers (or equivalent devices). In a preferred embodiment thereof, a novel pumping-enabled coupler array comprises a central channel (i.e., waveguide), configured to transmit a signal (i.e., serving as a "signal channel") which will thereafter be amplified or utilized to generate lasing, and further comprises at least one additional channel (i.e., waveguide), configured to provide optical pumping functionality (i.e., each serving as a "pump channel"). In various exemplary alternative embodiments thereof, the novel pumping-enabled coupler array may comprise the following in any desired combination thereof:

at least one of the following signal channels: a single mode signal channel configured for optimum coupling to a single mode amplifying fiber at at least one predetermined signal or lasing wavelength, a multimode signal channel configured for optimum coupling to a multimode amplifying fiber at at least one predetermined signal or lasing wavelength, and at least one of the following pumping channels: a single mode pumping channel configured for optimum coupling to a single mode pump source at at least one predetermined pumping wavelength, a multimode pumping channel configured for optimum coupling to a multimode pump source at at least one predetermined pumping wavelength.

Optionally, to maximize pumping efficiency, the novel pumping-enabled coupler array may be configured to selectively utilize less than all the available pumping channels.

It should also be noted that, as a matter of design choice, and without departing from the spirit of the invention, the novel pumping-enabled coupler array may be configured to comprise:

a. At least one signal channel, each disposed in a predetermined desired position in the coupler array structure;
b. At least one pumping channel, each disposed in a predetermined desired position in the coupler array structure; and
c. Optionally—at least one additional waveguide for at least one additional purpose other than signal transmission or pumping (e.g., such as a fiducial marker for alignment, for fault detection, for data transmission, etc.)

Advantageously, the pump channels could be positioned in any transverse position within the coupler, including along the central longitudinal axis. The pump channels may also comprise, but are not limited to, at least one of any of the following optical fiber types: SM, MM, LMA, or VC waveguides. Optionally, any of the optical fiber(s) being utilized as an optical pump channel (regardless of the fiber type) in the novel coupler may comprise polarization maintaining properties.

In yet another exemplary embodiment of the present invention, the novel pumping-enabled coupler array may be configured to be optimized for coupling to a double-clad fiber—in this case, the signal channel of the coupler array would be optimized for coupling to the signal channel of the double-clad fiber, while each of the at least one pumping channels would be optimized to couple to the inner cladding of the double-clad fiber.

In essence, the novel optical coupler arrays, shown by way of example in various embodiments of the present invention, may also be readily implemented as high density, multi-channel, optical input/output (I/O) for fiber-to-chip and fiber-to-optical waveguides. The inventive optical fiber couplers may readily comprise at least the following features:

Dramatically reduced channel spacing and device footprint (as compared to previously known solutions)
Scalable channel count
All-glass optical path
Readily butt-coupled or spliced at their high density face without the need of a lens, air gap, or a beam spreading medium
May be fabricated through a semi-automated production process
Broad range of customizable parameters: wavelength, mode field size, channel spacing, array configuration, fiber type.

The inventive optical fiber couplers may be advantageously utilized for at least the following applications, as a matter of design choice or convenience, without departing from the spirit of the invention:

Coupling to waveguides:
　PIC or PCB-based (single-mode or multimode)
　Multicore fibers
　Chip edge (ID) or chip face (2D) coupling
　NA optimized for the application, factoring in:
　　Packaging alignment needs
　　Chip processing needs/waveguide up-tapering
　Polarization maintaining properties may be readily configured Coupling to chip-based devices: e.g. VCSELs, photodiodes, vertically coupled gratings
Laser diode coupling
High density equipment Input/Output (I/O)

Figure 7:
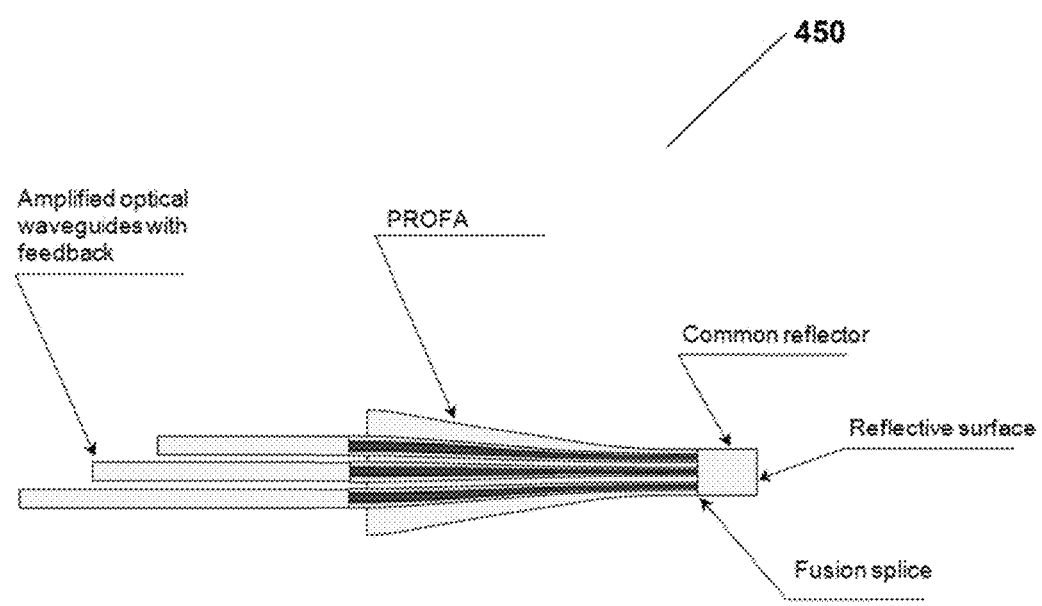
FIG. 7 is a schematic diagram of a phase locking optical fiber coupler comprising a monolithic pitch reducing optical fiber array (PROFA) component.

In conclusion, when implemented, the various exemplary embodiments of the inventive optical fiber couplers comprise at least the following advantages, as compared to currently available competitive solutions:

Unprecedented density
Low-loss coupling (≤0.5 dB)
Operational stability
Form factor support
Broad spectral range
Matching NA
Scalable channel count
Polarization maintenance Referring now to FIG. 7, at least one exemplary embodiment of the inventive optical coupler is shown as a phase locking optical fiber coupler 450, configured for use in applications requiring coherent combining of multiple fiber laser sources to produce superior high power single mode laser sources.

The vanishing core approach, described in '099 Patent, allows the creation of a pitch reducing optical fiber array (PROFA) interconnect—an optical device, which is fusion spliceable to an output glass optical element, comprising a reflector, serving as a laser output surface. As is shown in FIG. 7, this creates a monolithic structure, which maintains stability with respect to environmental fluctuations, including temperature variations and mechanical shock and vibration.

While in operation, the phase of all optical waveguides of the phase locking optical fiber coupler 450 become locked at the output surface of the common reflector, creating a high intensity in the far field. Some other benefits of utilizing a PROFA as a component of a Talbot cavity, include flexibility in the design parameters, enabling optimization of the array geometry and fill factor to achieve high efficiency. Also, the PROFA fabrication process enables highly accurate placement of the optical waveguides, which is a critical parameter in the maximizing Talbot cavity efficiency. For example, a better than one micron positional accuracy has been demonstrated for PROFA components with over sixty (60) waveguide channels In various embodiments thereof, the phase locking optical fiber coupler 450 can be readily utilized in multiple laser configurations, including a single master oscillator power amplifier (MOPA) configuration for one of the channels and amplifying cavities for the other channels, multiple MOPAs, or multiple laser cavities.

Thus, while there have been shown and described and pointed out fundamental novel features of the invention as applied to preferred embodiments thereof, it will be understood that various omissions and substitutions and changes in the form and details of the devices and methods illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

I claim:
1. A phase locking optical device comprising:
a common reflector, a plurality of optical waveguides, wherein at least one plural optical waveguide comprises means for generating optical feedback and light amplification; and at least one optical coupler array for optical coupling said plurality of optical waveguides and said common reflector, said optical coupler array comprising:

a common single coupler housing structure;

a plurality of longitudinal waveguides each positioned at a predetermined spacing from one another, each having a capacity for at least one optical mode of a predetermined mode field profile, each embedded in said common single housing structure, wherein at least one of said plural longitudinal waveguides is a vanishing core waveguide, each said at least one vanishing core waveguide comprising:

an inner vanishing core, having a first refractive index (N-1), and having a first inner core size (ICS-1) at said first end, and a second inner core size (ICS-2) at said second end;

an outer core, longitudinally surrounding said inner core, having a second refractive index (N-2), and having a first outer core size (OCS-1) at said first end, and a second outer core size (OCS-2) at said second end, and an outer cladding, longitudinally surrounding said outer core, having a third refractive index (N-3), a first cladding size at said first end, and a second cladding size at said second end; and wherein said common single coupler housing structure comprises a medium having a fourth refractive index (N-4) surrounding said plural longitudinal waveguides, wherein a predetermined relative magnitude relationship between said first, second, third and fourth refractive indices (N-1, N-2, N-3, and N-4, respectively), comprises the following magnitude relationship: (N-1>N-2>N-3), wherein a total volume of said medium of said common single coupler housing structure, is greater than a total volume of all said vanishing core waveguides inner cores and said outer cores confined within said common single coupler housing structure, and wherein said first inner vanishing core size (ICS-1), said first outer core size (OCS-1), and said predetermined spacing between said plural longitudinal waveguides, are simultaneously and gradually reduced, in accordance with a predetermined reduction profile, between said first end and said second end along said optical element, until said second inner vanishing core size (ICS-2) and said second outer core size (OCS-2) are reached, wherein said second inner vanishing core size (ICS-2) is selected to be insufficient to guide light therethrough, and said second outer core size (OCS-2) is selected to be sufficient to guide at least one optical mode, such that:

light traveling in a first direction from said first end to said second end escapes from said inner vanishing core into said corresponding outer core proximally to said second end, and light traveling in a second direction from said second end to said first end moves from said outer core into said corresponding inner vanishing core proximally to said first end.

* * * * *